United States Patent
Ueno et al.

(10) Patent No.: US 8,179,557 B2
(45) Date of Patent: May 15, 2012

(54) IMAGE FORMING APPARATUS FOR READING INFORMATION FROM AND WRITING INFORMATION TO A NON-CONTACT MEDIUM

(75) Inventors: Hideo Ueno, Nagoya (JP); Masashi Suzuki, Nagoya (JP); Hiroshi Koie, Nagoya (JP); Kazunari Taki, Nagoya (JP); Takahiro Ikeno, Seto (JP); Takahiro Hosokawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1152 days.

(21) Appl. No.: 11/861,617

(22) Filed: Sep. 26, 2007

(65) Prior Publication Data
US 2008/0080007 A1    Apr. 3, 2008

(30) Foreign Application Priority Data
Sep. 28, 2006   (JP) .................................. 2006-265320

(51) Int. Cl.
*G06K 15/00* (2006.01)

(52) U.S. Cl. ............... 358/1.18; 358/1.15; 358/1.14; 358/1.16; 358/1.13; 340/572.1; 399/8; 399/9; 399/10; 399/12; 399/24; 347/14; 347/19

(58) Field of Classification Search ............ 358/1.9, 358/1.16, 1.18, 504, 3.28, 1.14, 1.12, 1.15, 358/1.13; 235/375, 382; 340/572.1; 399/8, 399/9, 10, 12, 24, 45; 347/14, 19
See application file for complete search history.

(56) References Cited

U.S. PATENT DOCUMENTS

| | | | |
|---|---|---|---|
| 5,550,964 A | 8/1996 | Davoust | |
| 5,862,270 A | 1/1999 | Lopresti et al. | |
| 5,983,241 A | 11/1999 | Hoshino | |
| 6,233,409 B1 * | 5/2001 | Haines et al. | 399/10 |
| 6,409,401 B1 | 6/2002 | Petteruti et al. | |
| 6,477,528 B1 | 11/2002 | Takayama | |
| 6,486,056 B2 * | 11/2002 | Pasch et al. | 438/622 |
| 6,585,154 B1 | 7/2003 | Ostrover et al. | |
| 6,691,918 B1 | 2/2004 | Yoda et al. | |
| 6,827,279 B2 | 12/2004 | Teraura | |
| 6,846,056 B2 * | 1/2005 | Jacobsen et al. | 347/14 |
| 7,003,256 B2 * | 2/2006 | Kumakura et al. | 399/366 |
| 7,061,634 B1 | 6/2006 | Ogura et al. | |
| 7,405,841 B2 | 7/2008 | Takenouchi | |

(Continued)

FOREIGN PATENT DOCUMENTS

CN   1319821 A   10/2001

(Continued)

OTHER PUBLICATIONS

Technical Soft Inc,: http://www.softnet.com.jp/kaiteki/index.html; May 23, 2007.

(Continued)

*Primary Examiner* — Twyler Haskins
*Assistant Examiner* — Dennis Dicker
(74) *Attorney, Agent, or Firm* — Banner & Witcoff, Ltd.

(57) ABSTRACT

An image forming apparatus includes: an image forming unit; a controller that controls the image forming unit to form, on a recording medium, an image based on image data in accordance with a first print setting; and a data recording unit that records original data of the image data and the first print setting on a non-contact tag attached to the recording medium.

17 Claims, 13 Drawing Sheets

U.S. PATENT DOCUMENTS

| | | | |
|---|---|---|---|
| 7,428,067 B2 * | 9/2008 | Kiwada | 358/1.14 |
| 7,429,965 B2 | 9/2008 | Weiner | |
| 7,443,420 B2 | 10/2008 | Maeda | |
| 7,450,253 B2 * | 11/2008 | Kiwada | 358/1.14 |
| 7,466,957 B2 | 12/2008 | Muto | |
| 7,512,878 B2 | 3/2009 | Shur et al. | |
| 7,532,836 B2 | 5/2009 | Kawabuchi et al. | |
| 7,604,160 B2 * | 10/2009 | Imine et al. | 235/375 |
| 7,710,590 B2 * | 5/2010 | de Beus et al. | 358/1.15 |
| 7,728,992 B2 * | 6/2010 | Yamamoto et al. | 358/1.13 |
| 7,731,435 B2 | 6/2010 | Piersol et al. | |
| 7,905,403 B2 | 3/2011 | Nagase | |
| 7,916,031 B2 * | 3/2011 | Kothari et al. | 340/572.1 |
| 2002/0049702 A1 | 4/2002 | Aizikowitz et al. | |
| 2003/0053118 A1 * | 3/2003 | Muramoto et al. | 358/1.15 |
| 2003/0088557 A1 | 5/2003 | Morino | |
| 2003/0223638 A1 | 12/2003 | Jackson et al. | |
| 2004/0096123 A1 | 5/2004 | Shih et al. | |
| 2004/0100381 A1 | 5/2004 | Waters | |
| 2004/0109194 A1 | 6/2004 | Yano | |
| 2004/0141200 A1 | 7/2004 | Minami et al. | |
| 2004/0184097 A1 | 9/2004 | Suzuki | |
| 2005/0003839 A1 | 1/2005 | Tripp | |
| 2005/0024393 A1 | 2/2005 | Kondo et al. | |
| 2005/0029353 A1 | 2/2005 | Isemura et al. | |
| 2005/0105724 A1 | 5/2005 | Hull et al. | |
| 2005/0125093 A1 | 6/2005 | Kikuchi et al. | |
| 2005/0141003 A1 | 6/2005 | Yamamoto et al. | |
| 2005/0141004 A1 | 6/2005 | Kiwada | |
| 2005/0162699 A1 | 7/2005 | Fukunaga et al. | |
| 2005/0171739 A1 | 8/2005 | Squibbs et al. | |
| 2005/0175259 A1 | 8/2005 | Takenouchi | |
| 2005/0200910 A1 | 9/2005 | Kanoshima et al. | |
| 2006/0017950 A1 | 1/2006 | Ikegami et al. | |
| 2006/0047999 A1 | 3/2006 | Passerini et al. | |
| 2006/0051056 A1 | 3/2006 | Furukawa et al. | |
| 2006/0061814 A1 | 3/2006 | Tokunaga | |
| 2006/0076399 A1 | 4/2006 | Imine et al. | |
| 2006/0098236 A1 | 5/2006 | Yamashita et al. | |
| 2006/0132816 A1 | 6/2006 | Yamamoto et al. | |
| 2006/0164696 A1 | 7/2006 | Kurohata et al. | |
| 2006/0176511 A1 | 8/2006 | Tagawa | |
| 2006/0248454 A1 | 11/2006 | Giannetti | |
| 2007/0024901 A1 | 2/2007 | Kayama | |
| 2007/0036599 A1 | 2/2007 | Piersol et al. | |
| 2007/0078559 A1 | 4/2007 | Rosen | |
| 2007/0146878 A1 | 6/2007 | Liao | |
| 2007/0152058 A1 | 7/2007 | Yeakley et al. | |
| 2007/0273525 A1 | 11/2007 | Garber et al. | |
| 2008/0079994 A1 | 4/2008 | Ueno et al. | |
| 2008/0098303 A1 | 4/2008 | Murayama | |
| 2008/0151299 A1 | 6/2008 | Takahata | |
| 2008/0180710 A1 | 7/2008 | Muto | |
| 2008/0232882 A1 | 9/2008 | Koi et al. | |
| 2008/0247794 A1 | 10/2008 | Muto | |
| 2008/0317479 A1 | 12/2008 | Kadowaki | |

FOREIGN PATENT DOCUMENTS

| | | | |
|---|---|---|---|
| EP | 0 944 238 A1 | 9/1999 | |
| JP | 62-171049 A | 7/1987 | |
| JP | 62-197840 A | 9/1987 | |
| JP | 63-065544 A | 3/1988 | |
| JP | 2-260045 A | 10/1990 | |
| JP | 3-4937 B2 | 1/1991 | |
| JP | 3-102438 A | 4/1991 | |
| JP | 5-113920 A | 5/1993 | |
| JP | 7-334397 A | 12/1995 | |
| JP | 8-202603 A | 8/1996 | |
| JP | 9-034763 A | 2/1997 | |
| JP | 2624170 B2 | 4/1997 | |
| JP | 10-294818 A | 11/1998 | |
| JP | 2000-020664 | 1/2000 | |
| JP | 3036977 B2 | 4/2000 | |
| JP | 2000-285203 | 10/2000 | |
| JP | 2001-043231 A | 2/2001 | |
| JP | 2001-134723 | 5/2001 | |
| JP | 2001-180021 A | 7/2001 | |
| JP | 2002-149701 A | 5/2002 | |
| JP | 2002-337426 | 11/2002 | |
| JP | 2003-242158 A | 8/2003 | |
| JP | 2003-263084 A | 9/2003 | |
| JP | 2003-320735 | 11/2003 | |
| JP | 2003-330769 A | 11/2003 | |
| JP | 2003-346086 A | 12/2003 | |
| JP | 2004-066692 | 3/2004 | |
| JP | 2004-094731 A | 3/2004 | |
| JP | 2004-094953 | 3/2004 | |
| JP | 2004-157588 | 6/2004 | |
| JP | 2004-181953 A | 7/2004 | |
| JP | 2004-222085 | 8/2004 | |
| JP | 2004-249499 | 9/2004 | |
| JP | 2004-265586 A | 9/2004 | |
| JP | 2004-287556 | 10/2004 | |
| JP | 2004-310293 | 11/2004 | |
| JP | 2004-310293 A | 11/2004 | |
| JP | 2004-314590 A | 11/2004 | |
| JP | 2004-322570 | 11/2004 | |
| JP | 2005-028673 A | 2/2005 | |
| JP | 2005-059577 | 3/2005 | |
| JP | 2005-101935 | 4/2005 | |
| JP | 2005-109681 | 4/2005 | |
| JP | 2005-117571 | 4/2005 | |
| JP | 2005-148240 | 6/2005 | |
| JP | 2005-149291 A | 6/2005 | |
| JP | 2005-151244 A | 6/2005 | |
| JP | 2005-165410 A | 6/2005 | |
| JP | 2005-174530 | 6/2005 | |
| JP | 2005-192080 | 7/2005 | |
| JP | 2005-196263 | 7/2005 | |
| JP | 2005-196840 A | 7/2005 | |
| JP | 2005-197831 | 7/2005 | |
| JP | 2005-197834 | 7/2005 | |
| JP | 2005-197835 | 7/2005 | |
| JP | 2005-202714 A | 7/2005 | |
| JP | 2005-212303 | 8/2005 | |
| JP | 2005-225100 | 8/2005 | |
| JP | 2005-229266 | 8/2005 | |
| JP | 2005-236740 A | 9/2005 | |
| JP | 2005-242763 | 9/2005 | |
| JP | 2005-246680 A | 9/2005 | |
| JP | 2005-280046 | 10/2005 | |
| JP | 2005-285094 | 10/2005 | |
| JP | 2005-303422 A | 10/2005 | |
| JP | 2005-305662 | 11/2005 | |
| JP | 2005-313551 | 11/2005 | |
| JP | 2005-327248 | 11/2005 | |
| JP | 2005-332042 A | 12/2005 | |
| JP | 2006-007674 | 1/2006 | |
| JP | 2006-011977 | 1/2006 | |
| JP | 2006-027556 | 2/2006 | |
| JP | 2006-053671 A | 2/2006 | |
| JP | 2006-054777 A | 2/2006 | |
| JP | 2006-065912 A | 3/2006 | |
| JP | 2006-082490 A | 3/2006 | |
| JP | 2006-82940 A | 3/2006 | |
| JP | 2006-094037 A | 4/2006 | |
| JP | 2006-103284 A | 4/2006 | |
| JP | 2006-157439 A | 6/2006 | |
| JP | 2006-175647 A | 7/2006 | |
| JP | 2006-175813 A | 7/2006 | |
| JP | 2006-181807 A | 7/2006 | |
| JP | 2006-197324 A | 7/2006 | |
| JP | 2006-218773 A | 8/2006 | |
| JP | 2006-229670 A | 8/2006 | |
| JP | 2006-252045 A | 9/2006 | |
| JP | 2005-022847 | 1/2008 | |
| JP | 2008-511084 T | 4/2008 | |
| JP | 2001-077959 A | 10/2009 | |
| WO | 2006-023992 A2 | 3/2006 | |
| WO | 2006/023992 A2 | 3/2006 | |
| WO | 2006-064781 A1 | 6/2006 | |

OTHER PUBLICATIONS

Kinokuniya BookWeb; May 23, 2007.
Co-Pending U.S. Appl. No. 11/853,386, filed Sep. 11, 2007.
Co-Pending U.S. Appl. No. 11/860,259, filed Sep. 24, 2007.

Co-Pending U.S. Appl. No. 11/858,456, filed Sep. 20, 2007.
Co-Pending U.S. Appl. No. 11/857,803, filed Sep. 19, 2007.
Co-Pending U.S. Appl. No. 11/859,011, filed Sep. 21, 2007.
Co-Pending U.S. Appl. No. 11/859,481, filed Sep. 21, 2007.
Co-Pending U.S. Appl. No. 11/860,067, filed Sep. 24, 2007.
Co-Pending U.S. Appl. No. 11/860,163, filed Sep. 27, 2007.
Co-Pending U.S. Appl. No. 11/862,246, filed Sep. 27, 2007.
JP Office Action dtd Oct. 28, 2008, JP Appln. 2006-265321 (partial translation provided).
JP Office Action dtd Oct. 21, 2008, JP Appln. 2006-262750.
JP Office Action dtd Oct. 14, 2008, JP Appln. 2006-252991.
JP Office Action dtd Oct. 14, 2008, JP Appln. 2006-252990 (partial translation provided).
JP Office Action dtd Oct. 21, 2008, JP Appln. 2006-265322 (partial translation provided).
JP Office Action dtd Aug. 26, 2008, JP Appln. 2006-259117.
JP Office Action dtd Aug. 5, 2008, JP Appln. 2006-257295.
JP Office Action dtd Jan. 20, 2009, JP Appln. 2006-259138.
EP Search Report dtd Mar. 10, 2008, EP App 07253797-0.
CN Office Action dtd May 8, 2009, CN Appln. 200710154195.5, partial English translation.
CN Office Action dtd May 22, 2009, CN Appln. 2007101525327, English translation.
Extended EP Search Report dtd Jul. 2, 2009, EP Appln. 07253683.2.
JP Office Action dtd May 20, 2008, JP Appln. 2006-265320.
JP Office Action dtd May 27, 2008, JP Appln. 2006-259138 (no English translation provided).
JP Office Action dtd Jul. 14, 2009, JP Appln. 2006-265321, partial English Translation.
Notification of Reasons for Refusal dispatched Aug. 17, 2010 in Japanese Application No. 2008-188246 and English Translation thereof.
Non-Final Office Action dated Nov. 10, 2010 in U.S. Appl. No. 11/860,067.
Non-Final Office Action dated Jun. 28, 2011 in U.S. Appl. No. 11/860,163.
Non-Final Office Action dated Jun. 22, 2011 in U.S. Appl. No. 11/859,011.
Notice of Allowance dated Jul. 8, 2011 in U.S. Appl. No. 11/853,386.
Non-Final Office Action dated Mar. 7, 2011 in U.S. Appl. No. 11/857,803.
Non-Final Office Action dated Mar. 2, 2011 in U.S. Appl. No. 11/858,456.
Non-Final Office Action dated Feb. 18, 2011 in U.S. Appl. No. 11/862,246.
Non-Final Office Action dated Mar. 22, 2011 in U.S. Appl. No. 11/859,481.
Non-Final Office Action dated Apr. 5, 2011 in U.S. Appl. No. 11/860,067.
Notice of Allowance dated Sep. 1, 2011 in U.S. Appl. No. 11/860,067.
Final Office Action dated Aug. 3, 2011 in U.S. Appl. No. 11/862,246.
Final Office Action dated Aug. 12, 2011 in U.S. Appl. No. 11/857,803.
Final Office Action dated Aug. 17, 2011 in U.S. Appl. No. 11/858,456.
Final Office Action dated Aug. 30, 2011 in U.S. Appl. No. 11/859,481.
Non-Final Office Action dated Dec. 14, 2011 in U.S. Appl. No. 11/860,259.
Final Office Action dated Dec. 1, 2011 in U.S. Appl. No. 11/859,011.
Notice of Allowance dated Oct. 17, 2011 in U.S. Appl. No. 11/860,163.
Final Office Action dated Dec. 27, 2011 in U.S. Appl. No. 11/862,246.
Non-Final Office Action dated Feb. 15, 2012 in U.S. Appl. No. 11/857,803.

* cited by examiner

IMAGE FORMING APPARATUS FOR READING INFORMATION FROM AND WRITING INFORMATION TO A NON-CONTACT MEDIUM

CROSS-REFERENCE TO RELATED APPLICATION

This application claims priority from Japanese Patent Application No. 2006-265320, filed on Sep. 28, 2006, the entire subject matter of which is incorporated herein by reference.

TECHNICAL FIELD

Aspects of the present invention relate to an image forming apparatus including an image forming unit that forms an image of a recording medium and can read or write the original data of image data on a non-contact tag, and to a computer program product for implementing the image forming apparatus.

BACKGROUND

A non-contact tag such as a Radio Frequency Identification tag (RFID tag) is attached to (or also imbedded in) a recording medium such as a sheet. An image is formed on a recording medium and at the same time, data is recorded on the non-contact tag. For example, JP-A-2005-197835 describes that when an image is formed on a sheet based on image data, the original data of the image data is recorded on the non-contact tag attached to the sheet in order to make the original data available for later user.

SUMMARY

However, when images are formed even based on the same original data, image forming apparatuses (e.g., printers) having different performances for forming (printing) the image could not form an image with the same settings as the initial image formation so that the images are printed differently. On the other hand, the image forming apparatuses having improved performances could more satisfactorily meet the initial requirements. Aspects of the present invention relate to the above-problem. According to at least one aspect of the present invention, an image forming apparatus may be provided that can read or write the original data of image data on a non-contact tag and form an image while meeting as much as possible the initial requirement for forming the image even when the image forming apparatus has a different performance.

According to an aspect of the present invention, an image forming apparatus includes: an image forming unit; a controller that controls the image forming unit to form, on a recording medium, an image based on image data in accordance with a first print setting; and a data recording unit that records original data of the image data and the first print setting on a non-contact tag attached to the recording medium.

DETAILED DESCRIPTION

[Overall Configuration of the Embodiment]

Figure 1:
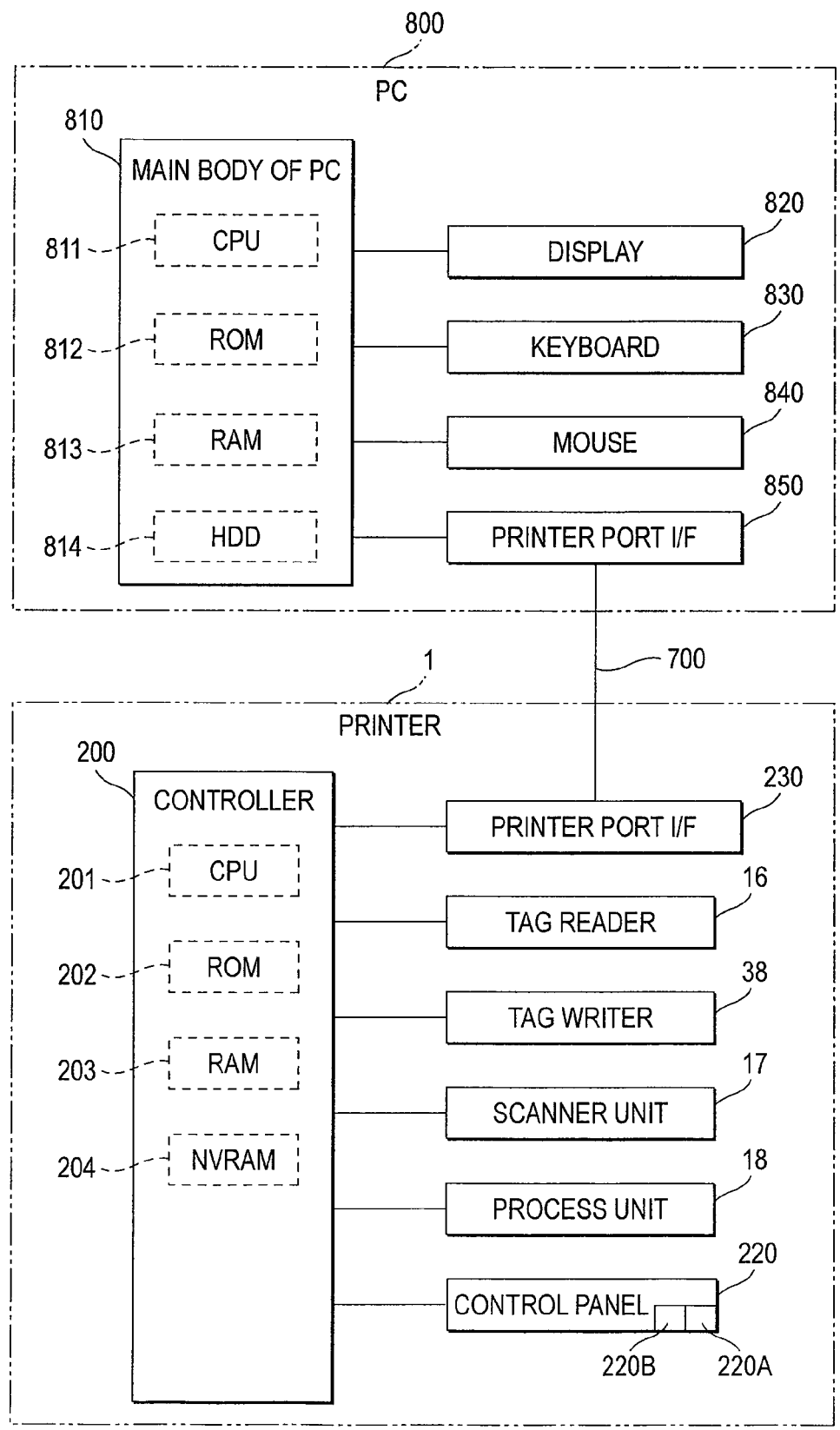
FIG. 1 is a block diagram showing the configuration of an image forming system according to an embodiment of the present invention.

Next, embodiments of the present invention will be described below with reference to the accompanying drawings. FIG. 1 is a block diagram showing the configuration of an image forming system according to an embodiment of the present invention. As shown in FIG. 1, the image forming system of this embodiment includes a printer 1 serving as an image forming apparatus and a personal computer (hereinafter simply referred to as PC) 800 serving as an upper device connected to the printer 1 via a cable 700. Note that the printer 1 and PC 800 may be connected via an intranet LAN or the Internet.

[Description of the Configuration of the Printer 1]

Figure 2:
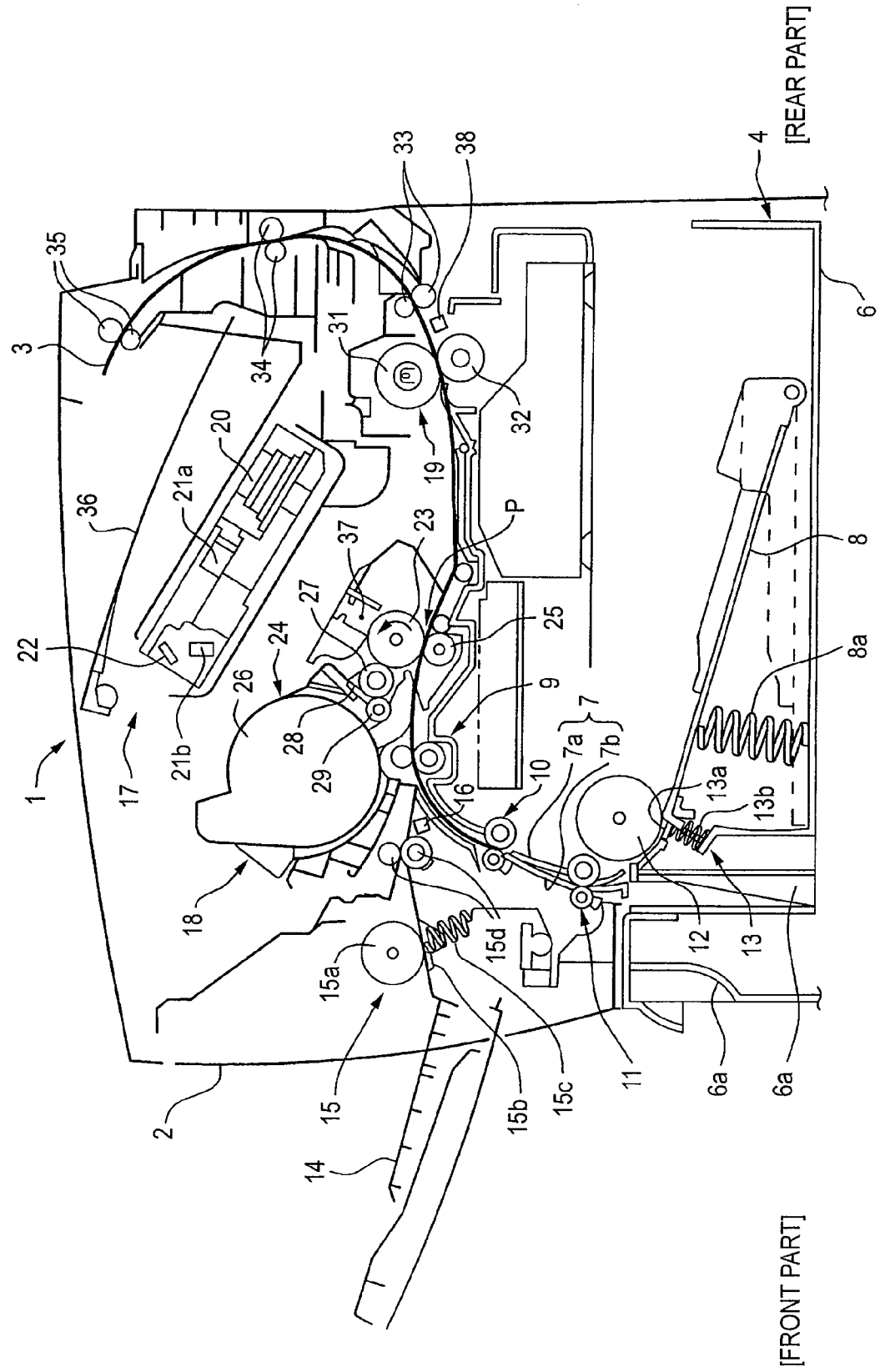
FIG. 2 is a schematic cross-sectional view showing the internal configuration of a printer in the image forming system.

FIG. 2 is a schematic cross-sectional view showing the internal configuration of the printer 1. As shown in FIG. 2, within a main body case 2, the printer 1 includes a feeder part 4 for feeding sheet 3 serving as a recording medium; a multi-purpose tray 14; a process unit 18 as an example of an image forming unit for forming an image on the fed sheet 3; and a fixing unit 19. Note that in the printer 1, the side on which the multi-purpose tray 14 is mounted in the main body case 2 (the left side in FIG. 2) is hereinafter referred to as the "front part," while the side opposite on which the multi-purpose tray 14 is mounted in the main body case 2 is referred to as the "rear part."

[Description of the Configuration of the Feeder Part 4]

As shown in FIG. 2, in the bottom part of the main body case 2, the feeder part 4 includes a detachable sheet feed tray 6, a sheet retainer plate 8 provided in the sheet feed tray 6, a feed roller 12 provided above an end of the sheet feed tray 6, and a separation pad 13. In addition, there is provided a curved feed path 7 from the feed roller 12 to an image forming position P (or a contact part between a photosensitive drum 23 and a transfer roller 25, i.e., a transfer position at which a toner image on the photosensitive drum 23 is transferred onto the sheet 3).

The sheet retainer plate 8, which can retain the sheets 3 stacked in layers, is pivotably supported at the distal end part relative to the feed roller 12, thereby the proximal end part is allowed to move up and down. The sheet retainer plate 8 is upwardly energized by a spring 8*a* on its back. The separation pad 13 is disposed to oppose the feed roller 12, so that a pad 13*a* composed of a member having a high friction coefficient is pushed against the feed roller 12 by a spring 13*b*.

On the other hand, the feed path 7 is formed in a curved shape by a pair of guide plates 7*a* and 7*b* for guiding the sheet 3. In addition, there are disposed at appropriate intervals on the feed path 7 sequentially from the upstream of the sheet feed direction, the feed roller 12; a pair of feed rollers 11 including a pair of a drive roller and a follower roller, a pair of feed rollers 10 including a pair of a drive roller and a follower roller; and a pair of registration rollers 9 including a pair of a drive roller and a follower roller disposed immediately before the image forming position P.

In the feeder part 4 configured as described above, the topmost sheet 3 of those stacked in layers on the sheet retainer plate 8 is pushed against the feed roller 12, and sandwiched between the feed roller 12 and the separation pad 13 by the feed roller 12 being rotated, thereby sheets are fed one by one. The thus fed sheet 3 is also fed by the feed rollers 11, and then sequentially by the feed rollers 10 and the registration rollers 9 to the image forming position P with a predetermined timing.

[Description of the Configuration of the Multi-Purpose Tray 14]

On the front part side of the main body case 2 above the feeder part 4, there are disposed the multi-purpose tray 14 which serves to supply the sheets 3 manually or automatically and a multi-purpose side sheet feed mechanism 15 for feeding the sheets 3 stacked in layers on the multi-purpose tray 14. The multi-purpose side sheet teed mechanism 15 includes a feed roller for the multi-purpose tray 15*a* and a multi-purpose side sheet feed pad 15*h*, and allows the multi-purpose side sheet feed pad 15*b* to be pushed against the feed roller for the multi-purpose tray 15*a* by a spring 15*c* disposed on the back of the multi-purpose side sheet feed pad 15*b*. In addition, the multi-purpose side sheet feed mechanism 15 includes a pair of feed rollers 15*d* including a pair of drive roller and a follower roller.

In the multi-purpose tray 14 configured as described above, the sheets 3 stacked in layers on the multi-purpose tray 14 are sandwiched between the feed roller for the multi-purpose tray 15*a* being rotated and the multi-purpose side sheet feed pad 15*b*, and then fed one by one to the registration rollers 9 via a pair of feed rollers 15*d*.

Figure 3:
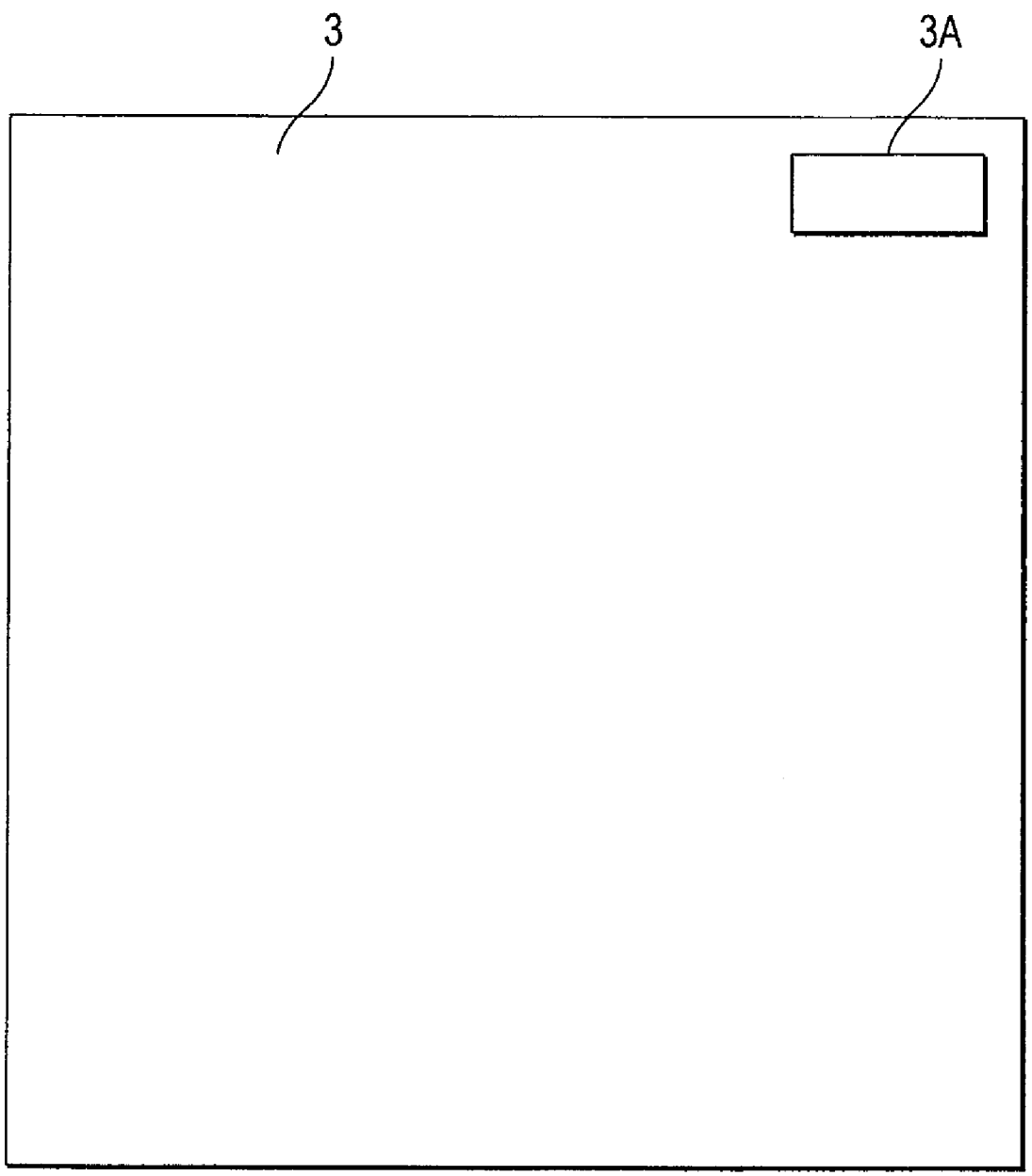
FIG. 3 is an explanatory view showing the configuration of a sheet equipped with a non-contact tag.

There is also disposed a tag reader 16 serving as data reading unit between the feed rollers 15*d*, 10 and the registration rollers 9. When the sheet 3 as shown in FIG. 3 having a Radio Frequency Identification Tag (RFID tag: hereinafter simply referred to as the tag) 3A as an example of a non-contact tag (first non-contact tag and second non-contact tag) is used, the tag reader 16 reads data recorded on the tag 3A. Consequently, while the sheet 3 equipped with the tag 3A is transported from the sheet feed tray 6 or the multi-purpose tray 14 to the image forming position P, the tag reader 16 can read data from the tag 3A attached to the sheet 3. Note that when data is read from (read out from) the tag 3A attached to the sheet 3 held in the multi-purpose tray 14, it is not always necessary to read (read out) the data by the tag reader 16 while the sheet 3 is being fed. For example, with the sheet 3 being held (placed) in the multi-purpose tray 14, the data may be read (read out) from the tag 3A attached to the sheet 3 by the tag reader 16.

[Description of the Configuration of a Scanner Unit 17]

The scanner unit 17 is disposed under a sheet discharging tray 36 in the upper part of the main body case 2, and includes a laser emitting part (not shown), a rotatably driven polygon mirror 20, lenses 21*a* and 21*b*, and a reflection mirror 22. The laser emitting part emits a laser beam and the laser beam is passing through or reflected from the polygon mirror 20, the lens 21*a*, the reflection mirror 22, and the lens 21*b* so that the scanner unit 17 allows a laser beam to illuminate and quickly scan across the surface of the photosensitive drum 23 of the process unit 18.

[Description of the Configuration of the Process Unit 18]

The process unit 18 includes the photosensitive drum 23 serving as an electrostatic latent image carrier, a scorotron type electrifier 37, a drum cartridge having the transfer roller 25 or the like, and a developing cartridge 24 detachably attached to the drum cartridge. The developing cartridge 24 includes a toner accommodating part 26, a developing roller 27, a layer thickness restricting blade 28, and a toner supply roller 29.

The toner accommodating part 26 is filled with positively charged non-magnetic one-composition polymeric toner as a developer. The toner is supplied by the toner supply roller 29 to the developing roller 27, at the time of which the toner is positively charged by friction between the toner supply roller 29 and the developing roller 27. Furthermore, the toner supplied onto the developing roller 27 is carried on the developing roller 27 in a thin layer of a uniform thickness by the layer thickness restricting blade 28 as the developing roller 27 rotates. On the other hand, the rotating photosensitive drum 23 is disposed opposite the developing roller 27, with the drum body being grounded and its surface being formed of a positively charged organic photosensitive material.

The scorotron type electrifier 37 is disposed above the photosensitive drum 23 with a predetermined gap therebetween so as not to be in contact with the photosensitive drum 23. The scorotron type electrifier 37 is a positively charging scorotron type electrifier which generates corona discharge from an electrifying wire such as of tungsten, and is designed to positively electrify the surface of the photosensitive drum 23 uniformly.

Then, as the photosensitive drum 23 rotates, the surface of the photosensitive drum 23 is first uniformly and positively charged by the scorotron type electrifier 37, and thereafter exposed to the laser beam from the scanner unit 17 during a quick scan, thereby an electrostatic latent image is formed based on the image data.

Subsequently, as the developing roller 27 rotates, the positively charged toner carried on the developing roller 27 is brought into contact with the photosensitive drum 23. At this time, the toner is supplied onto the electrostatic latent image formed on the surface of the photosensitive drum 23, i.e., onto the exposed part having a reduced potential due to the exposure to the laser beam on the uniformly and positively charged surface of the photosensitive drum 23. Thus, the toner is selectively carried to visualize the image, thereby a toner image is formed.

The transfer roller 25 is disposed below the photosensitive drum 23 to oppose the photosensitive drum 23, and supported rotatably in the clockwise direction in FIG. 2 in the drum cartridge. The transfer roller 25 is configured such that a metal roller shaft is coated with a roller formed of an ionic conductive rubber material, and receives a transfer bias (forward transfer bias) applied thereto from a transfer bias application power supply during transfer. Consequently, the toner image carried on the surface of the photosensitive drum 23 is transferred onto the sheet 3 at the above-described image forming position P while the sheet 3 is passing through between the photosensitive drum 23 and the transfer roller 25.

[Description of the Configuration of the Fixing Unit 19]

As shown in FIG. 2, the fixing unit 19 is disposed to the right of the process unit 18 downstream of the feed direction, and includes one heating roller 31, a pressure roller 32 disposed to push against the heating roller 31, and a pair of feed rollers 33 provided downstream of them. The heating roller 31, which is formed of a metal such as aluminum and includes a heater such as a halogen lamp for heating, allows the toner transferred to the sheet 3 in the process unit 18 to be thermally fixed while the sheet 3 passes through between the heating roller 31 and the pressure roller 32. Thereafter, the sheet 3 is fed by the feed rollers 33 into the discharging path in the rear side part of the main body case 2, and then further fed by feed rollers 34 and discharge rollers 35. Subsequently, the sheet 3 is discharged onto the sheet discharging tray 36.

Furthermore, there is provided a tag writer 38, as an example of data recording unit capable of recording data on the above-described tag 3A, on the sheet feed path between the heating roller 31, the pressure roller 32, and the feed rollers 33. Consequently, when the sheet 3 equipped with the tag 3A is used, desired data can be recorded on (or also written to) the tag 3A of the sheet 3 after an image has been formed thereon.

[Description of the Control System of the Printer 1]

In addition, on the upper surface of the printer 1, there are provided an operation panel 220 including various types of buttons (not shown) such as a tag reading button 220A and a re-printing button 220B or an operation panel 220 (see FIG. 1) with a liquid crystal display (not shown). Referring back to FIG. 1, the operation panel 220 is connected to a controller 200 in conjunction with the process unit 18, the scanner unit 17, the tag writer 38, and the tag reader 16. The controller 200 is configured as a microcomputer including a CPU 201, a ROM 202, a RAM 203, and a NVRAM 204 in which stored contents will not be erased even when the power supply switch is turned OFF. In addition, the controller 200 is connected to the PC 800 via a printer port interface (printer port I/F) 230 and the cable 700.

A PC main body 810 of the PC 800 includes a CPU 811, a ROM 812, a RAM 813, and a hard disk drive (HDD) 814. The PC main body 810 is connected with a display 820 such as a CRT, a keyboard 830, a mouse 840, and a printer port interface (printer port I/F) 850 for connecting to a controller 200 of a printer 1.

[Processing in the Control System (Processing in the PC 800)]

Figure 4:
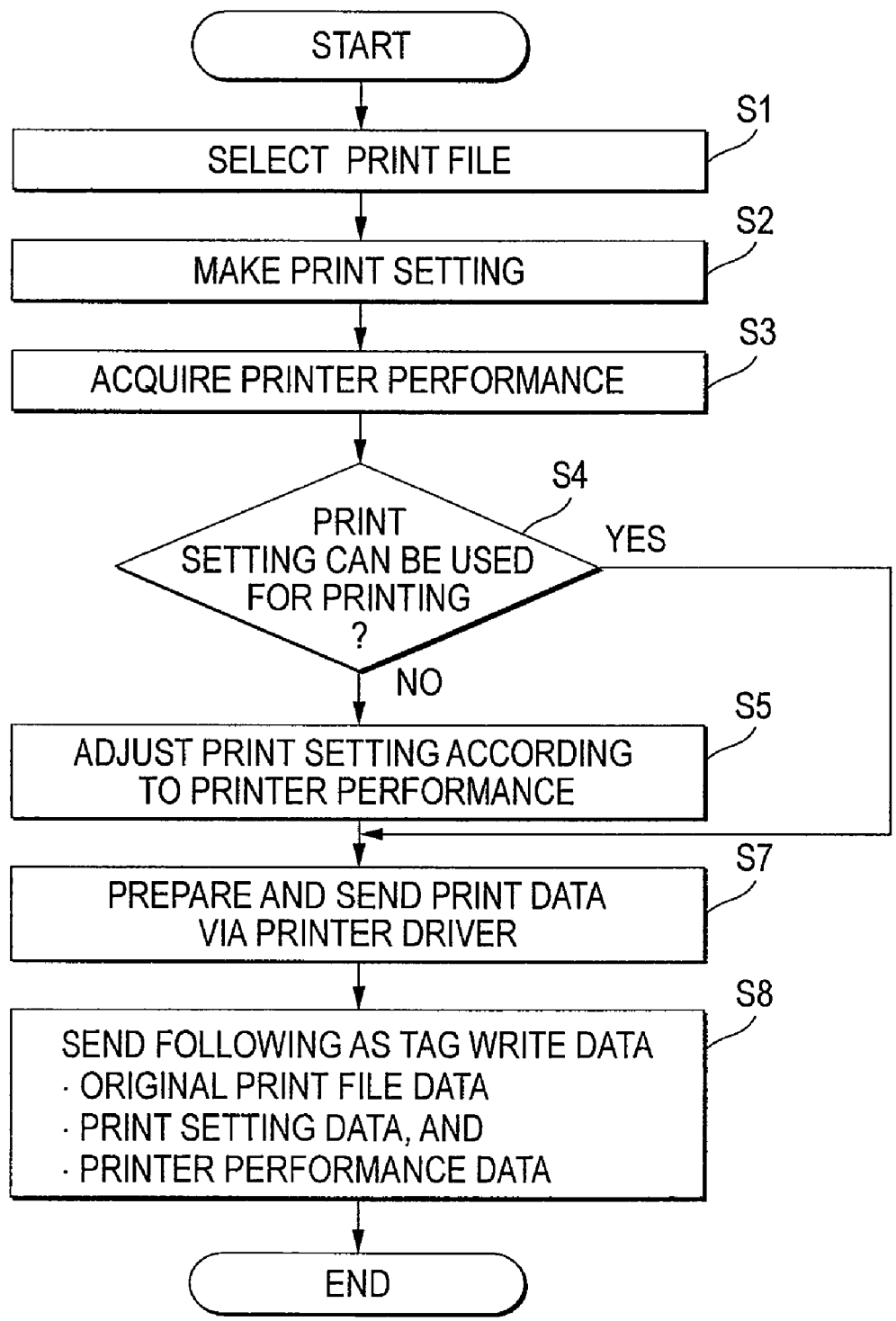
FIG. 4 is a flowchart showing the printing control process to be executed by a PC in the image forming system.

Now, description will be made for the processing performed in this control system. FIG. 4 is a flowchart showing a printing control process to be executed at the PC 800. Note that this processing is initiated after a print file for printing use (corresponding to the original data of image data) has been generated at the PC 800 using various types of applications and then a user interface for printing use is displayed on the display 820.

As shown in FIG. 4, when the process is started, first in S1 (hereinafter S stands for a step), the print file and a page to be printed are selected based on an input on the user interface by the keyboard 830, the mouse 840 or the like. In S2, a print setting is made based on an input on the user interface by the keyboard 830, the mouse 840 or the like. For example, various settings are made such as on color printing or monochrome printing, the degree of resolution, the size of sheets to be used, frameless print or else.

In S3, by communicating with the printer 1, the printer performance of the printer 1 is acquired, and then in S4, it is determined whether the print settings made in S2 is applicable in printing by the printer 1. When the print settings is not applicable in printing (S4: N), then in S5, the print settings are adjusted according to the printer performance of the printer 1 and thereafter the process proceeds to S7. When the settings is applicable in printing (S4: Y), the process proceeds to S7. In S7, the data of the print file selected in S1 is rasterized according to the print settings set in S2 or S5 by a printer driver installed in a HDD 814, and sent to the printer 1 as print data (hereinafter also referred to as the rasterized data) serving as image data for controlling the image forming unit.

In S8, for example, when the print file is to be printed on a plurality of pages, the original print file data attached with print page data indicating the ordinal number of a page printed, the print setting data that has been set in S2 and adjusted as required in s5, and the printer performance data acquired in S3 is sent to the printer 1 as tag write data. Then, the process ends. Note that the printer performance data may be the model number of the printer (the so-called version) or its specification.

[Process in the Control System (Process in the Printer 1)]

Figure 5:
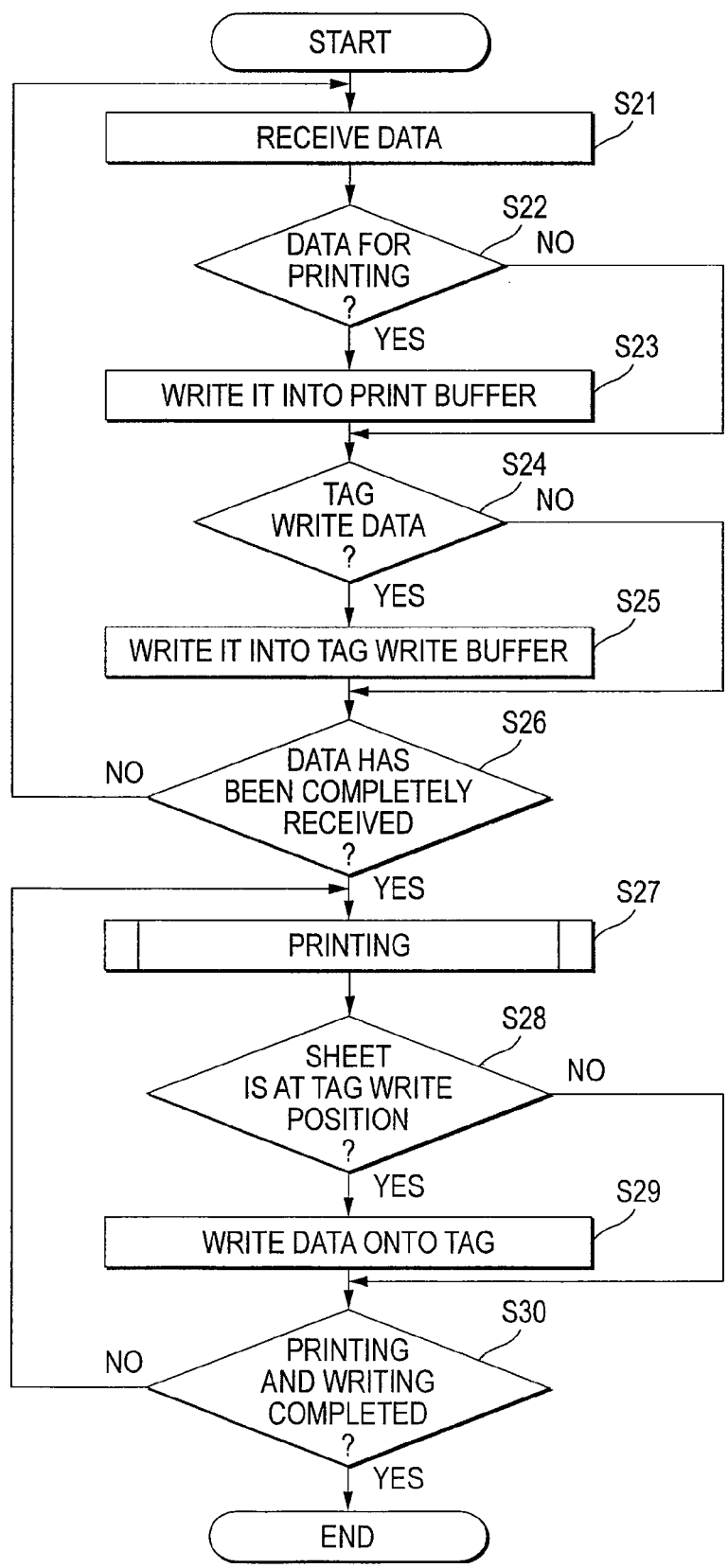
FIG. 5 is a flowchart showing the printer printing process to be executed in the printer.

Now, FIG. 5 is a flow chart showing the printer printing process to be executed in the controller 200 of the printer 1 according to the printing control process. This process is started when the PC 800 sends data to the printer 1 and a CPU 201 executes a program stored in a ROM 202.

As shown in FIG. 5, when the process is started, first in S21, the data sent from the PC 800 is received, and then in S22, it is determined whether the received data is print data. When it is print data (S22: Y), then in S23, the print data is written into the print buffer defined in a RAM 203 and then the process proceeds to S24. When it is not print data (S22: N), the process proceeds to S24.

In S24, it is determined whether the received data is tag write data. When it is tag write data (S24: Y), then in S25, the tag write data is written into the tag write buffer defined in the RAM 203, and thereafter the process proceeds to S26. When it is not tag write data (S24: N), the process proceeds to S26. In S26, it is determined whether the data from the PC 800 has been completely received. When the data was not completely received (S26. N), then the process proceeds to S21, so that the processes of S21 to S25 mentioned above will be repeated.

On the other hand, when the data was completely received from the PC 800 (S26: Y), then the process proceeds to S27, where a scanner unit 17, a process unit 18 or the like are driven based on the print data, thereby initiating printing on the sheet 3. In S28, it is determined whether the sheet 3 has been conveyed to the tag write position at which the tag writer 38 can write data onto the tag 3A. When it is not at the tag write position (S28: N), the process proceeds to S30. When it is at the tag write position (S28: Y), then in S29, the tag write data is written onto the tag 3A, and thereafter, the process proceeds to S30. Note that in S29, the print data (rasterized data) as well as the data sent as the tag write data in S8 mentioned above is written onto the tag 3A.

In S30, it is determined whether the printing on the sheet 3 and the writing on the tag 3A have been completely finished. When not yet finished (S30: N), then the process proceeds to S27, so that the processes of S27 to S29 mentioned above will be repeated. When the printing on the sheet 3 and the writing on the tag 3A have been completely finished (S30: Y), then the process once ends. Through the processes, the image corresponding to the print data is printed on the sheet 3A, while the tag write data and rasterized data is written onto the tag 3A.

Figure 6:
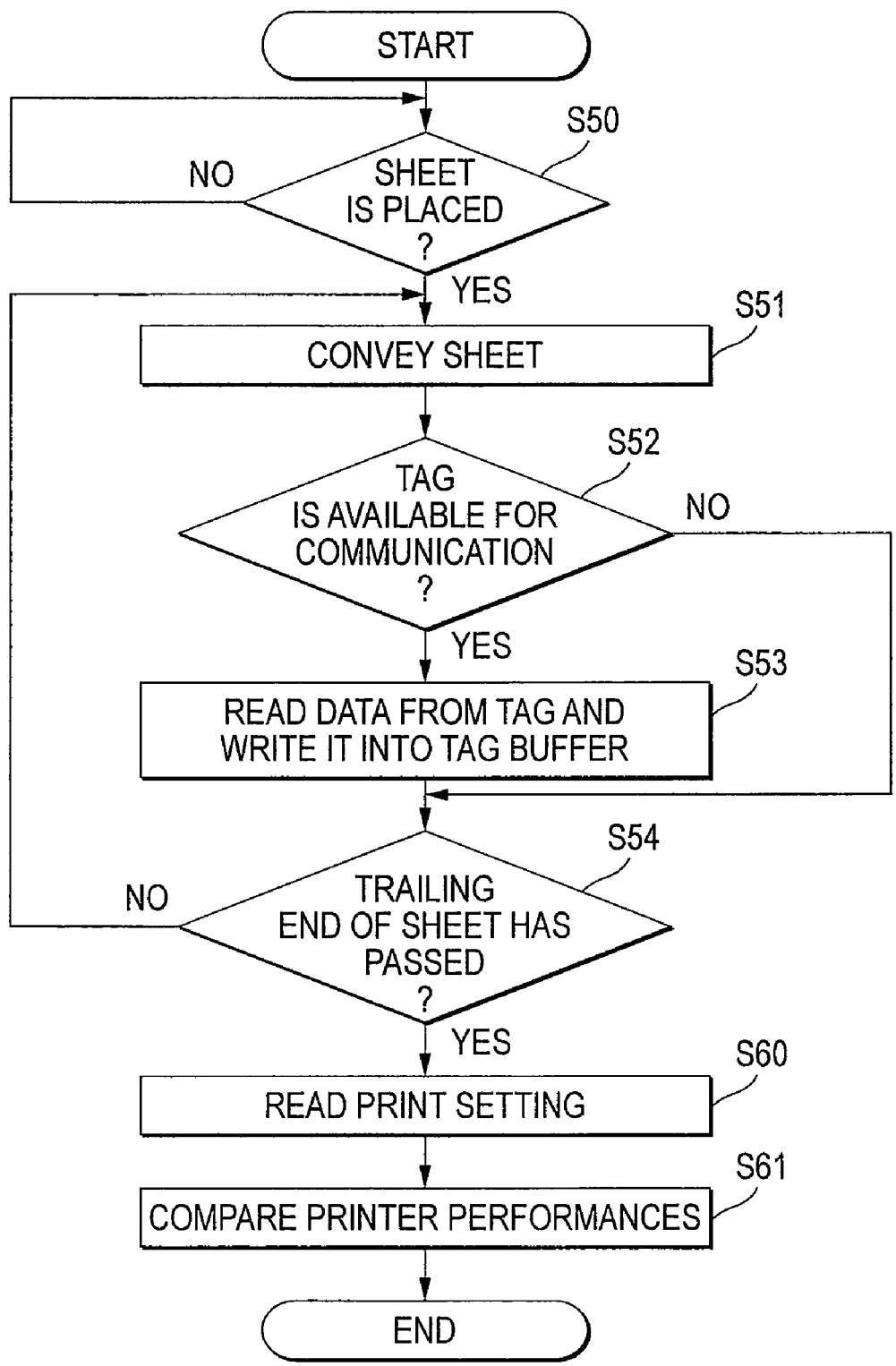
FIG. 6 is a flowchart showing part of the printer re-printing process to be executed in the printer.
Figure 7:
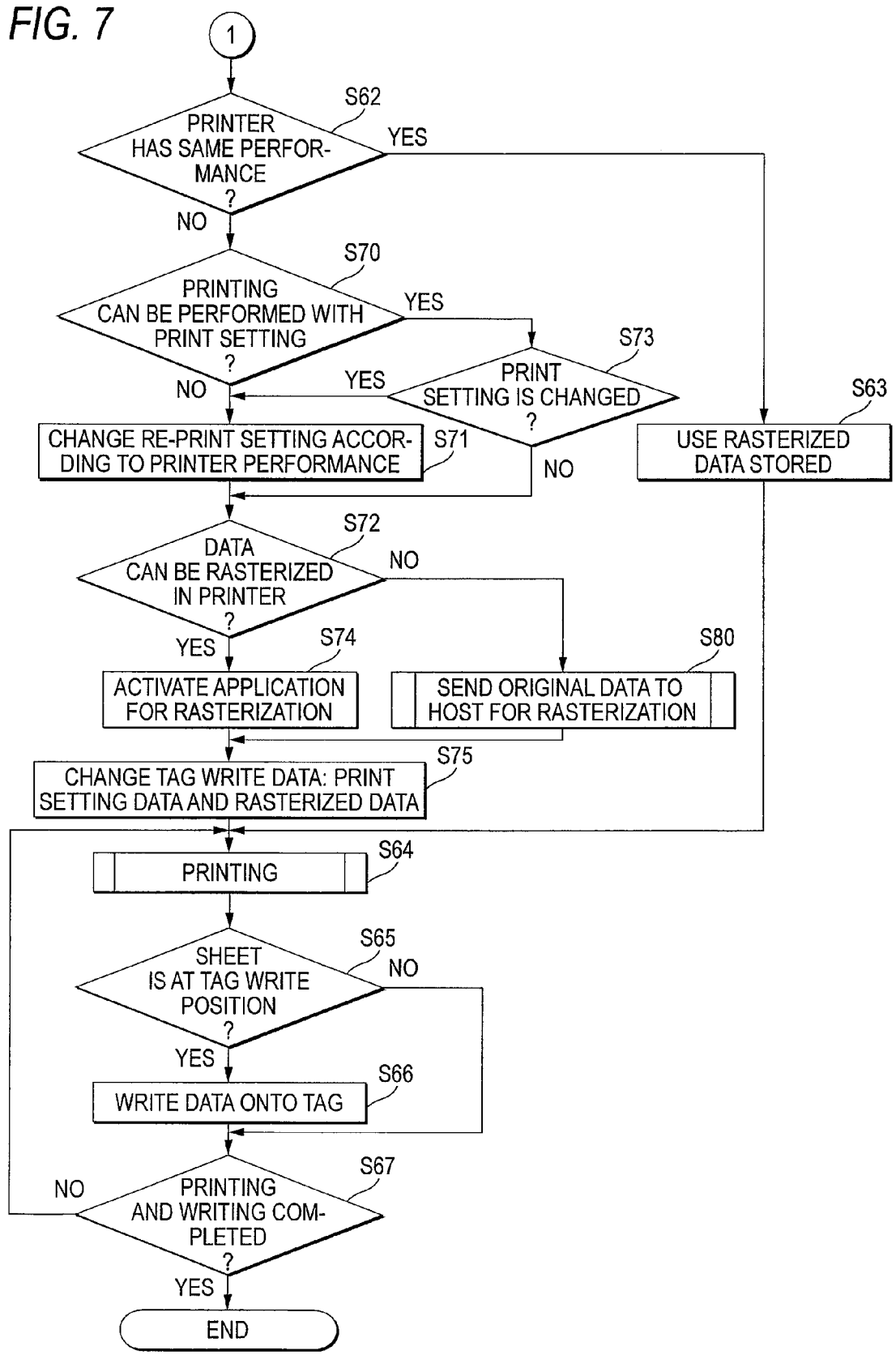
FIG. 7 is a flowchart showing a continuation of the printer re-printing process.

In a printer 1, the sheet 3 having the image printed thereon with the data written on the tag 3A as described above can be placed in a multi-purpose tray 14, and then a re-printing button 220B on the control panel 220 is pressed, thereby allowing the image to be printed on another sheet 3 in the same manner as with the sheet 3. FIGS. 6 and 7 show a flowchart of a printer re-printing process which enables such an operation. Note that this process is started when the re-printing button 220B is pressed so that the CPU 201 executes the program stored on the ROM 202.

As shown in FIGS. 6 and 7, when the process is started, first in S50, it is determined whether the sheet 3 is placed in the multi-purpose tray 14. When the sheet 3 is not placed (S50: N), the process waits as it is in S50. When the sheet 3 is placed (S50: Y), then in S51, the sheet 3 starts to be conveyed.

In S52, it is determined whether the tag reader 16 can communicate with the tag 3A. When the communication is not available (S52: N), the process proceeds to S54. When the communication is available (S52: Y), then in S53, data is read from the tag 3A via the tag reader 16 and written into the tag buffer in the RAM 203, and thereafter, the process proceeds to S54. In S54, it is determined whether the trailing end of the sheet 3 has passed so that the sheet 3 is discharged onto the sheet discharging tray 36. When the trailing end of the sheet has not passed yet (S54: N), the process proceeds to S51 mentioned above, where the processes of S51 to S53 will be repeated. When the trailing end of the sheet has passed (S54: Y), the process proceeds to S60.

Note that when data is read from the tag 3A attached to the sheet 3 placed in the multi-purpose tray 14, it is not always necessary to read the data while the sheet 3 is being conveyed. For example, the data may be read from the tag 3A attached to the sheet 3 with the sheet 3 set (placed) in the multi-purpose tray 14.

Figure 13:
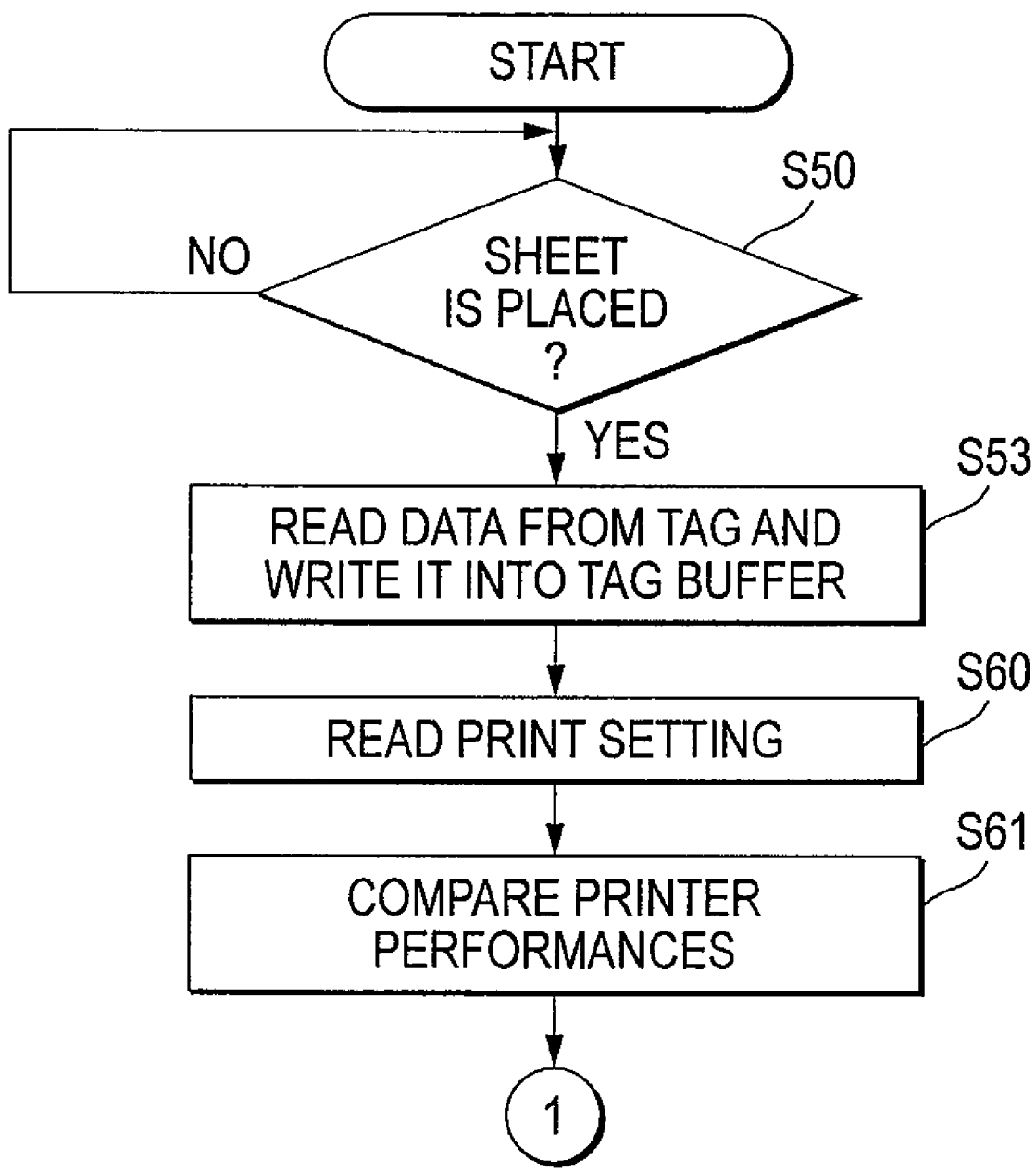
FIG. 13 is a flowchart showing a modified example of part of the printer re-printing process.

FIG. 13 shows part of the printer re-printing process which enables such a reading operation where the processes of S51, S52, and S54 shown in FIG. 6 are eliminated.

In either case of FIG. 6 or FIG. 13, the print setting data is read in S60 from the data that has been read from the tag 3A. In S61, the printer performance data is read from the data that have been read from the tag 3A, so that the printer performance data is compared with the performance of itself (i.e., the printer 1). In S62 of FIG. 7, it is determined whether the performance corresponding to the printer performance data, which has been read, is the same as the performance of the printer 1. When the printer performance is the same (S62: Y), then the data is set to utilize the rasterized data that has been read from the tag 3A and stored in the tag buffer. Then, in s64, the rasterized data is used for printing. That is, an image associated with the rasterized data is formed on a new sheet 3 that is fed from the sheet feed tray 6.

In S65, it is determined whether the sheet 3 has been conveyed to the tag write position at which the tag writer 38 can write data onto the tag 3A. When it is not at the tag write position (S65: N), the process proceeds to S67. When it is at the tag write position (S65: Y), then in S66, the data written into the tag buffer in S53 is written onto the tag 3A of the sheet 3 fed from the sheet feed tray 6 and thereafter, the process proceeds to S67. In this case, the original print file data and the print setting data, the printer performance data and the rasterized data are written onto the tag 3A.

In S67, it is determined whether the printing on the sheet 3 and the writing on the tag 3A have been completely finished When not yet finished (S67: N), then the process proceeds to S64, where the processes of S64 to S66 mentioned above will be repeated. When the printing on the sheet 3 and the writing on the tag 3A have been completely finished (S67; Y), then the process once ends. Through the processes, the same image as the one that has been printed on the sheet 3 fed from the multi-purpose tray 14 can be printed on the sheet 3 fed from the sheet teed tray 6 (S64), and the same data as that stored on the tag 3A of the former sheet 3 can also be written on the tag SA of the latter sheet 3 (S66). Note when an ordinary sheet 3 with no tag 3A would be held in the sheet feed tray 6, the writing on the tag 3A (S66) would not be carried out, so that this process ends when the sheet 3 has been conveyed to its trailing end.

On the other hand, when the printer 1 has not the same performance (S62: N), then the process proceeds to S70, it is determined whether printing can be performed using the print settings corresponding to the print setting data having been read in accordance with the version and specification of the printer 1. When the printing cannot be performed (S70: N), then in S71, re-print settings are made to meet as much as possible the print setting data having been read, and thereafter, the process proceeds to S72. That is, in S71, various settings such as on the color printing or monochrome printing, the degree of resolution, the size of sheets to be used, frameless print or else are made to meet the print setting data read from the tag 3A as much as possible. In other words, the re-print setting is set as similar as possible to the print setting data as long as the print can be performed. For example, the print setting having been read may show color printing with 256 levels of gray whereas the printer 1 can provide color printing with 128 levels of gray at most. In this case, the uppermost 128 levels of gray are set as the re-print setting. Also, the print setting having been read may show printing with a resolution of 1200 dpi whereas the printer 1 can print with a resolution of 600 dpi at most. In this case, the uppermost 600 dpi is set as the re-print setting. Further, the print setting having been read may show frameless print whereas the printer 1 can not print with such setting. In this case, the re-print setting in which margin of a page is as small as possible.

On the other hand, when the printing can be performed using the print settings (S70: Y), then in S73, an inquiry is made to the user via the control panel 220 about whether to change the print settings. When the print settings are to be changed (S73; Y), the process proceeds to S71 mentioned above. When the print settings are not to be changed (S73: N), then the process proceeds to S72. Note that in this case, in the process of S71, a re-print setting is made according to a user's input on the control panel 220.

In S72, it is determined whether the original print file data read from the tag 3A can be rasterized by the printer 1. When possible (S72: Y), then in S74, an application pre-stored in the ROM 202 is activated for rasterization. In S75, the tag write data to be written on the tag 3A of the sheet 3 fed from the sheet feed tray 6 is changed as follows, and then the process proceeds to S64. That is, in S75, each relevant data read from the tag 3A of the sheet 3 fed from the multi-purpose tray 14 is replaced with the print setting data that has been re-set in S71, when applicable, and the rasterized data which has been newly rasterized as mentioned above (see S74, and S80 to be discussed later). Thereafter, when the process proceeds to S64 and S66 mentioned above, printing is performed according to the re-print settings made in S71 on the sheet 3 fed from the sheet feed tray 6 (S64), and the tag write data having the print setting data and the rasterized data replaced in S75 and the original print file data is recorded on the tag 3A (S66).

On the other hand, when the print file data cannot be rasterized in the printer 1 (S72: N), then in S80, the original print file data and the print setting data then available is sent to the host (in this case, the PC 800), so that the rasterized data is sent back. Thereafter, the process proceeds to S75 mentioned above.

Figure 8:
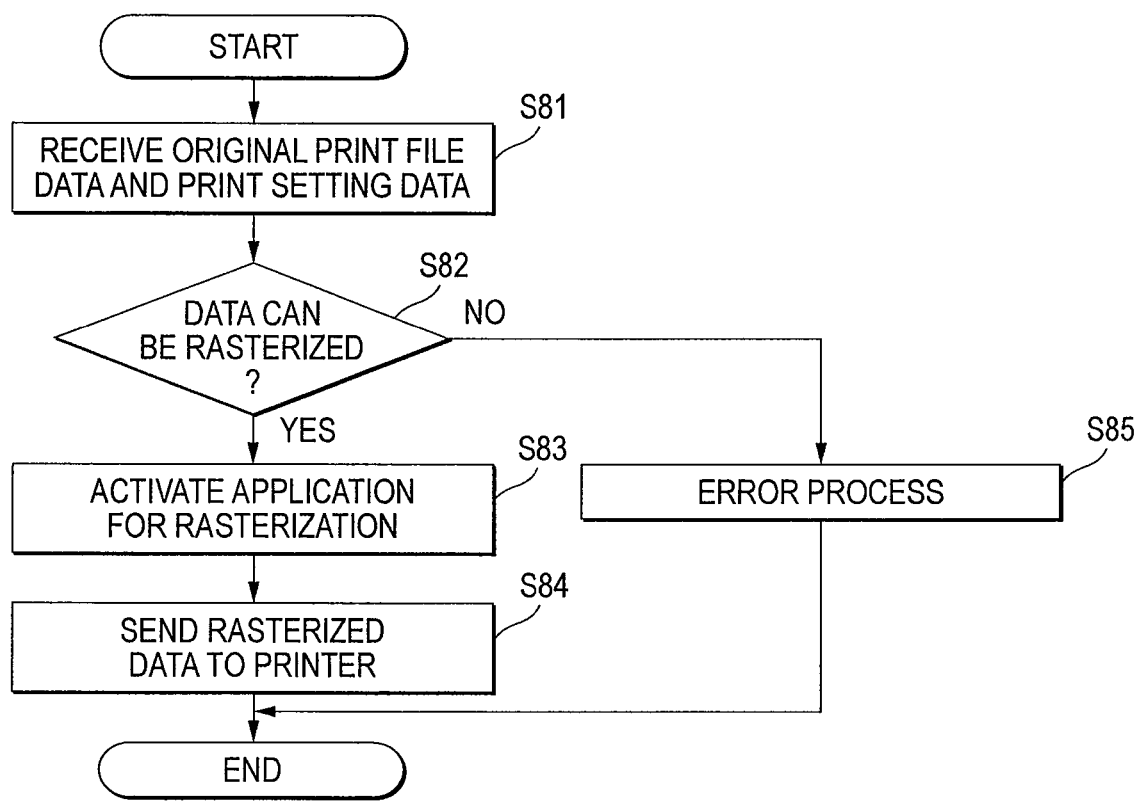
FIG. 8 is a flowchart showing a process to be executed in the PC according to the printer re-printing process.

FIG. 8 is a flowchart showing the process to be executed in the PC 800 or the process of S80 mentioned above. As shown in FIG. 8, in this process, first in S81, the original print file data attached with the print page data and the print setting data read from the tag 3A or re-set in S71 is received. In S82, based on the print file data and the print setting data, it is determined whether the PC 800 can perform rasterization.

When possible (S82: Y), then in S83, an application is activated to perform the rasterization. In S84, the rasterized data is sent to the printer 1 and then the process ends. On the other hand, when the rasterization cannot be performed (S82: N), error processing is performed in S85, e.g., an error message is issued to inform the printer 1 of it. Then, the process ends. In this manner, when the printer 1 cannot perform rasterization by itself (S72: N), the PC 800 may perform the rasterization to enable printing in some cases.

EFFECTS OF THIS EMBODIMENT

As described the above, in the printer re-printing process of this embodiment, printing can be performed on a new sheet 3 in accordance with the same settings as for the initial printing (refer to FIG. 5) when possible (S70: Y), whereas even when not possible, the printing can be performed in accordance with the setting most similar to the initial print setting as possible (S71). Furthermore, the data read from the tag 3A of the sheet 3 fed from the multi-purpose tray 14 in the printer re-printing process is altered as required and then written on the tag 3A of the newly printed sheet 3. Accordingly, the newly printed sheet 3 can also be used to perform the similar printing. Furthermore, when the printer has a different performance but the similar setting can be made (S62: N, S70: Y), the user can alter the print settings (S73), and thus the setting can be changed to the one much more similar to the user's desired setting when the printer 1 has an improved performance.

On the other hand, the printer 1 has the same performance as that for the previous printing (S62: Y), the printing is carried out in accordance with the rasterized data read from the tag 3A without waiting for the user's instruction. Accordingly, printing can be quickly carried out in the same manner as previously done without the user's instruction. Furthermore, when the printer 1 itself cannot perform rasterization (S72: N), the PC 800 can instead perform the rasterization (S80). Thus, this allows for performing the process on print files of much more types. Furthermore, as described above, the rasterized data is written on the tag SA of the newly printed sheet 3, and thus the subsequent re-printing can be performed without the activation of the application (S74) or the communication with the PC 800 (S80).

Note that in the embodiment, the process of S27 corresponds to a controller, the process of S29 corresponds to a data recording unit, the process of S62 and S70 corresponds to a determination unit, the processes of S63, S64, S71, S74, and S80 corresponds to a controller, and the process of S66 corresponds to a data recording unit.

Modified Examples of the Embodiment

The present invention is not limited to the embodiment but may also be implemented in various forms without deviating from the scope and spirit of the present invention. For example, the process of 73 may be eliminated. In this case, when printing can be performed based on the print settings (S70: Y), the printing is automatically performed based on the print setting without waiting for the user's instruction.

Figure 9:
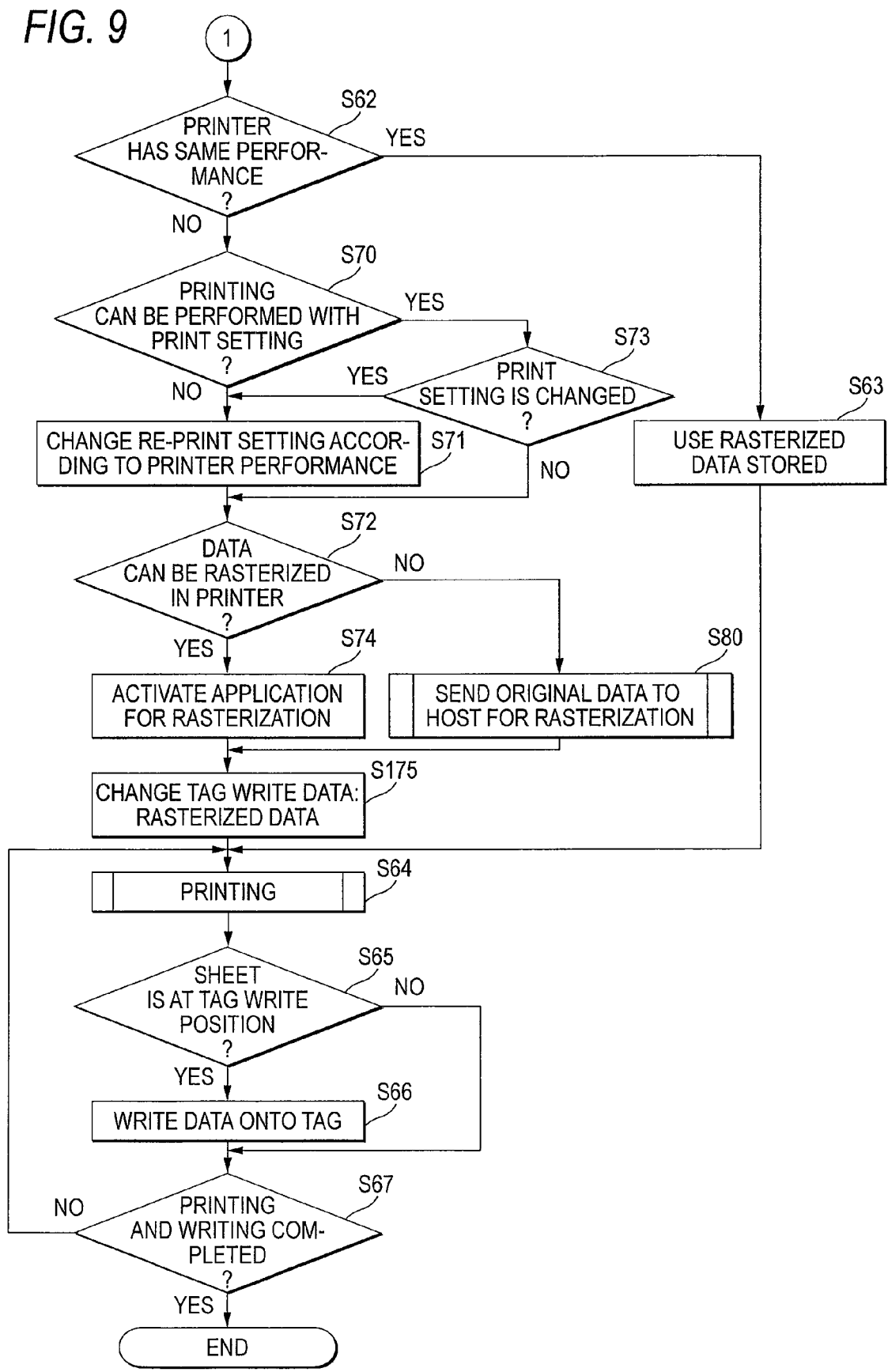
FIG. 9 is a flowchart showing a modified example of the printer re-printing process.

Additionally, the printer re-printing process may be farther altered as follows. FIG. 9 is a flowchart showing part of a modified example of the printer re-printing process. Note that this process is different from the process shown in FIG. 7 only in that S175 is executed in place of S75, and thus description will be made only for those different points. In S75 mentioned above, the print setting data and the rasterized data was altered. In contrast to this, in S175, only the rasterized data is changed. Accordingly, in the embodiment, the subsequent printing can be executed with the print setting changed such as in S71, whereas in this embodiment, the initial print settings can be left unchanged regardless of a change in the print settings made such as in S71.

Figure 10:
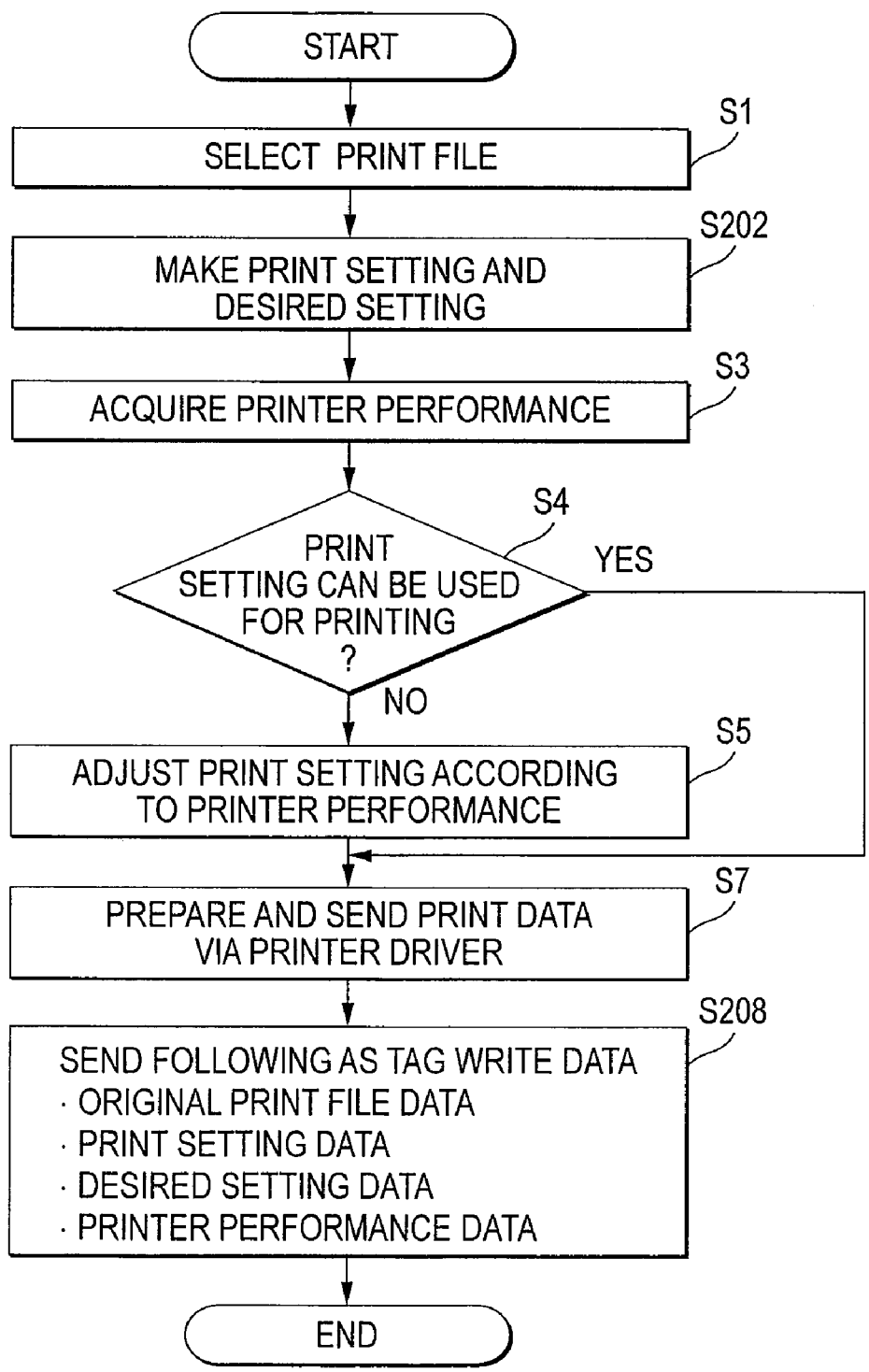
FIG. 10 is a flowchart showing a modified example of the printing control process.

Additionally, as described below, such a print setting that could not be made at the initial printing may also be made settable in advance as a desired setting. FIG. 10 is a flowchart showing a modified example of the printing control process which enables such a desired setting in the PC 800.

In this process, in S202 to be executed in place of S2, the desired setting is made together with the print setting. The desired setting is made as a user's desire even when the printer 1 cannot then meet various settings, e.g., such as on color printing or monochrome printing, the degree of resolution, the size of sheets to be used, or frameless print or else. Furthermore, in S208 to be executed in place of S8, the desired setting data is also sent as the tag write data together with the original print file data, print setting data, and printer performance data. Then, in the printer 1, these data are written onto the tag 3A of the sheet 3 in S29 mentioned above.

Figure 11:
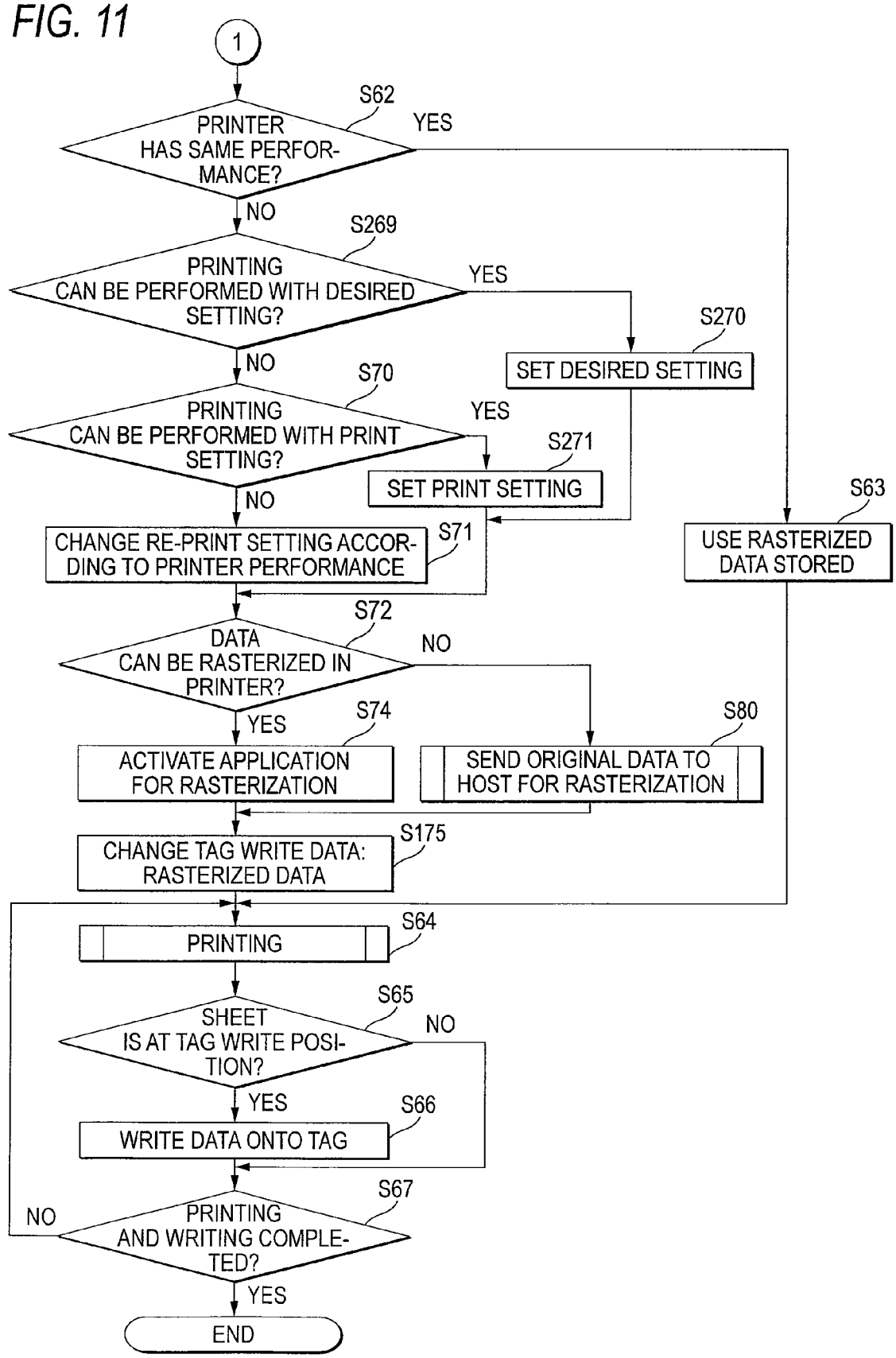
FIG. 11 is a flowchart showing a modified example of the printer re-printing process associated with the printing control process.

FIG. 11 is a flowchart showing a modified example of the printer re-printing process in which employed is a sheet 3 with such data written on its tag 3A. In this process, when it has been determined in S62 mentioned above that the printer has a different performance (S62: N), then in S269, it is determined whether printing can be performed with the desired setting. When the desired setting can be used for the printing (S269: Y), the desired setting is set in S270. Then, the process proceeds to S72.

On the other hand, when the desired setting cannot be used for the printing (S269: N), the process then proceeds to S70 mentioned above, so that it is determined whether the print settings can be used for the printing. When not possible (S70: N), the process proceeds to S71 mentioned above. When possible (S70: Y), then in S271, the print settings are set. After that, the process proceeds to S72 mentioned above. Note that when a setting much more similar to the desired setting than the print setting, such a setting may be automatically made in the process of S271. As such, this embodiment allows for executing printing with such a setting that could not be initially made for the printing but may meet as much as possible the setting desired by the user for the printing. Note that as in the example of FIG. 9, this embodiment employs the tag write data with only the rasterized data changed (S175); however, as in S75 of the example of FIG. 7, both the print setting data and the rasterized data may also be changed.

Additionally, in each of the embodiments, when the printer 1 has received from the PC 800 a command only to read the data on the tag 3A, or, when a tag read button 220A of the control panel 220 is pressed, the following tag data read process may be executed.

Figure 12:
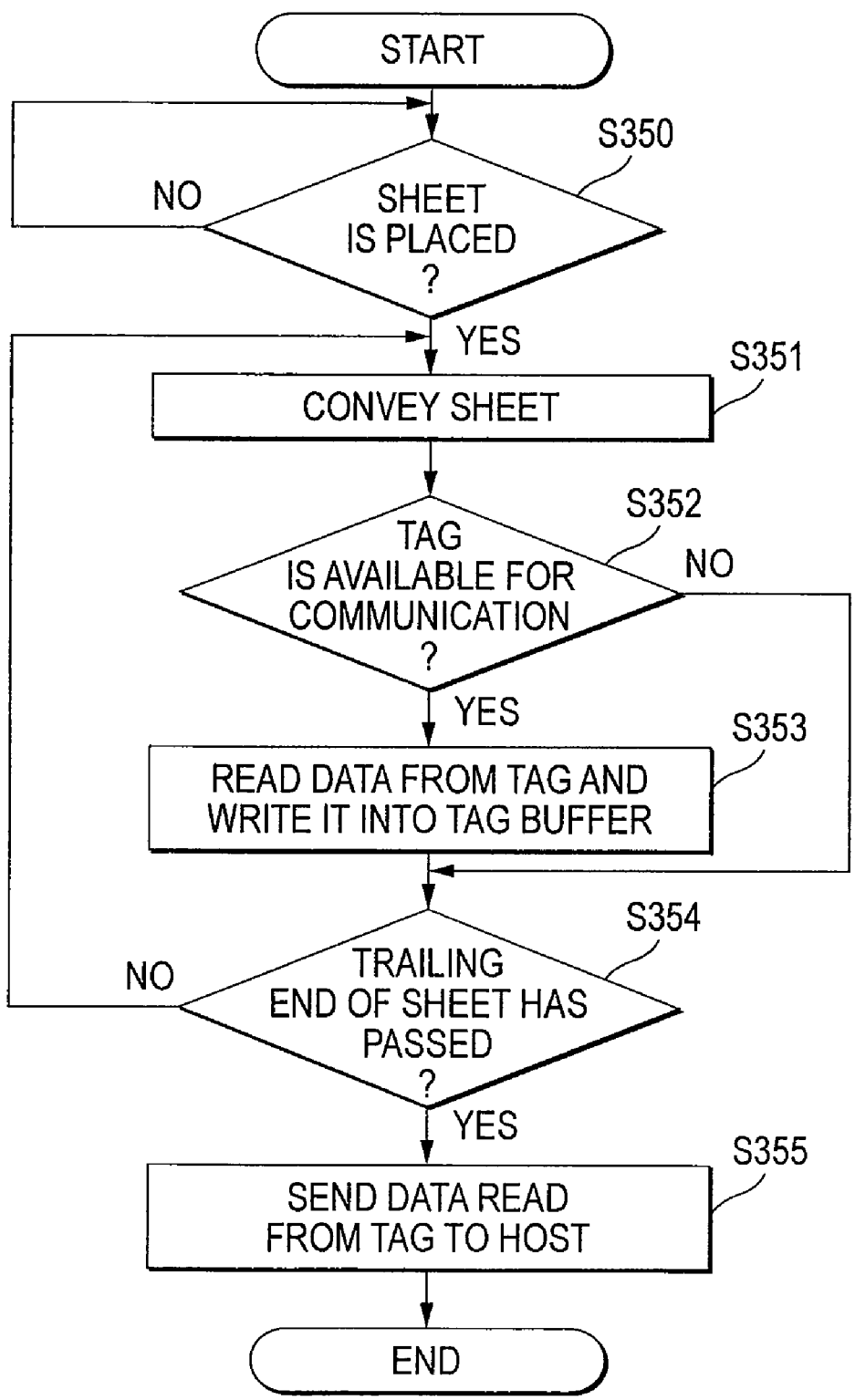
FIG. 12 is a flowchart showing a tag data read process to be executed in the printer.

FIG. 12 is a flowchart showing the tag data read process. As shown in FIG. 12, when the process is started, first in S350 to S354, the same processes as those of S50 to S54 mentioned above are executed, so that the sheet 3 placed in the multi-purpose tray 14 is conveyed (S351), and the data on the tag 3A of the sheet 3 is read (S353).

Then, when the trailing end of the sheet 3 has passed (S354: Y), the process proceeds to S355, where the data read from the tag 3A in S353 is sent to the host (in this case, the PC 800). Then, the process ends. In this manner, the data of the tag 3A is sent to the PC 800, thereby allowing the data stored on the tag 3A as described above (see S8, S29, S66, S75, S175, and S208) to be read from the tag 3A for use in the PC 800.

Note that also in the tag data read process shown in FIG. 12, as with the case of FIG. 6, it is not always necessary to read the data of the tag 3A attached to the sheet 3 while the sheet 3 placed in the multi-purpose tray 14 is being conveyed. For example, as in the process shown in FIG. 13, the data may also be read from the tag 3A attached to the sheet 3 with the sheet 3 set (placed) in the multi-purpose tray 14.

It is also possible to employ various types of image forming unit such as one which forms images by ejecting ink, without being limited to the one that forms images by electro-photography as in each of the embodiments. Furthermore, a tag which transmits and receives data using infrared rays may also be employed as a non-contact tag. Furthermore, a tag reader may be provided on the surface of the printer 1 or the like. In this case, when the same data as the tag write data is stored on a tag attached to other than the sheet 3, the data can be read to execute the printer printing process and the printer re-printing process in the same manner as described above.

Furthermore, for example, a multi-function device may be equipped with a Scanner (original document reader) function, a copying function, or a facsimile function in addition to the printer function. In this case, while the automatic document feeder mechanism (so-called ADF mechanism) included in the scanner function is conveying the sheet 3 attached with the tag 3A, the tag reader installed along the conveying path may read the data stored on the tag 3A.

The present invention provides illustrative, non-limiting embodiments as follows:

An image forming apparatus includes: an image forming unit; a controller that controls the image forming unit to form, on a recording medium, an image based on image data in accordance with a first print setting; and a data recording unit that records original data of the image data and the first print setting on a non-contact tag attached to the recording medium.

According to the above configuration, the controller controls the image forming unit based on image data and first print setting for forming the image, thereby forming the image on the recording medium. Additionally, the data recording unit records the original data of image data and the setting data on a non-contact tag when the non-contact tag is attached to the recording medium.

Accordingly, the image data and the setting data can be read from the non-contact tag on which the recording was performed by the data recording unit. In this case, even when the image forming apparatus has a different performance (e.g., the image forming unit has a different performance), an image can be formed with a setting which meets as much as possible the initial requirement for forming images, i.e., the initial setting for forming images. For example, even when an image is formed by an image forming unit having a performance interior to that for initial image formation, an image can be formed with a setting as similar to the first print setting as possible.

The data recording unit may further record, on the non-contact tag, performance data indicating a performance of the image forming apparatus. In this case, the performance of the image forming apparatus used for initially forming an image can be taken into consideration, thereby forming an image with a setting which further meets the initial requirement for forming images.

Additionally, the data recording unit may further record, on the non-contact tag, a second print setting (desired setting data), the desired setting data being incapable of being set in the image forming apparatus and representing a setting desired by the user for forming an image. In this case, the desired setting data can be read from the non-contact tag, thereby allowing for forming an image with such a setting that could not be initially made for forming the image but may meet as much as possible the requirement that the user desires for forming the image.

When the image based on the image data is formed on a plurality of pages of recording media, the data recording unit may records page data indicating an ordinal number of each page and the original data of the image data on respective one of non-contact tags attached to the recording media.

In this case, when print page data indicating an ordinal number of each page of a formed image is stored on the non-contact tag with the original data of the image data, the image of the page corresponding to the image data stored on the non-contact tag can be made to conform with the performance of the image forming apparatus.

An image forming apparatus includes an image forming unit; a data reading unit that reads, from a first non-contact tag attached to a first recording medium, original data of an image formed on the first recording medium by another image forming apparatus and a first print setting in accordance with which the other image forming apparatus forms the image on the first recording medium, a determination unit that determines whether the image forming unit is capable of forming an image in accordance with the first print setting; and a controller that controls the image forming unit to form an image. The controller controls the image forming unit to form, on a second recording medium, an image based on the original data in accordance with the first print setting read from the first non-contact tag when the determination unit determines that the image forming unit is capable of forming the image in accordance with the first print setting. The controller controls the image forming unit to form, on the second recording medium, an image based on the original data in accordance with a second print setting which is modified from the first print setting when the determination unit determines that the image forming unit is not capable of forming the image in accordance with the first print setting, the second print setting in accordance with which the image forming unit is capable of forming an image.

According to the above configuration, the data reading unit reads the original data and the setting data from the first non-contact tag which stores at least the original data of the image data and the setting data representing a setting for forming the image. Then, the determination unit determines whether the image forming unit is capable of forming an image based on the original data and setting data read by the data read unit.

Then, when the determination unit has determined that it is possible, the controller controls the image forming unit based on the original data and setting data having been read by the data reading unit. This allows an image to be formed on the recording medium while meeting the initial requirement for forming the image, i.e., with the same setting as that for forming the image employed when each data was recorded on the first non-contact tag. The second print setting may be set as similar as possible to the first print setting as long as the image forming unit is capable of forming the image.

Additionally, when the determination unit has determined that the image forming unit is non capable of forming an image, the controller controls the image forming unit based on the original data of image data with a setting as similar as possible to the setting of the setting data as long as an image can be formed. This allows an image to be formed on the recording medium while meeting the initial requirement for forming the image, i.e., with a setting as similar to the setting for initially forming the image as possible.

The determination unit may determine whether the image forming unit is capable of forming the image in accordance with the first print setting based on at least one of a performance of the image forming apparatus and a model number of the image forming apparatus. In this case, the determination can be made by a simplified process with improved reliability.

The image forming apparatus may further include a data recording unit disposed on a transporting path along which the second recording medium is transported through the image forming unit. The data recording unit may record, on a second non-contact tag attached to the second recording medium, data read from the first non-contact tag by the data reading unit. In this case, the same data as on the first non-contact tag is recorded also on the second non-contact tag attached to the recording medium on which an image is formed by the image forming apparatus. The data on the second non-contact tag can be read by the data reading unit, thereby also forming the same image.

The data reading unit may read performance data indicating a performance of the other image forming apparatus, which forms the image on the first recording medium, from the first non-contact tag. The determination unit may determine whether the performance of the other image forming apparatus, which forms the image on the first recording medium, read by the data reading unit conforms to a performance of the image forming apparatus. The controller may be operable to change the first print setting according to the user instruction when the determination unit determines that the image forming unit is capable of forming the image in accordance with the first print setting and the performance of the other image forming apparatus read from the first non-contact tag does not conform to the performance of the image forming apparatus.

In this case, when the performance data representing the performance of the image forming apparatus is stored on the first non-contact tag with the data, the data reading unit reads the performance data with the data. Then, the determination unit distinguishably determines that the image can be formed because the performance indicated by the performance data conforms to the performance of the image forming apparatus and that the image can be formed although the performance indicated by the performance data does not conform to the performance of the image forming apparatus.

In accordance with this determination, the controller allows the user to alter a setting corresponding to the setting data when the image can be formed although the performance indicated by the performance data does not conform to the performance of the image forming apparatus. Accordingly, for example, when the image forming apparatus has an improved performance, a change can be made to provide a setting much more similar to the setting desired by the user.

Furthermore, in this case, the controller may control the image forming unit to form the image without changing the first print setting when the determination unit determines that the image forming unit is capable of forming the image in accordance with the first print setting and the performance of the other image forming apparatus read by the data reading unit conforms to the performance of the image forming apparatus. In this case, when the image forming apparatus has the same performance, an image can be automatically formed according to the same setting as for the initial image formation without a user's instruction.

The data reading unit may further read, from the first non-contact tag, a third print setting to form an image in an ideal condition required by a user. When the image forming unit is capable of forming an image in accordance with a fourth print setting more similar to the third print setting than the first print setting, the controller may control the image forming unit to form an image based on the original data in accordance with the fourth print setting.

In this case, when the desired setting (third print setting) data representing a setting desired by the user for forming an image is stored on the first non-contact tag with the data, the data reading unit reads the desired setting data with the data. Then, when the image forming unit is capable of forming an image with a setting more similar to the setting of the desired setting data than to that of the setting data, the controller controls the image forming unit based on the original data of image data with a setting as similar as possible to the setting of the desired setting data as long as the image can be formed. Accordingly, for example, when the image forming apparatus has an improved performance of, an image can be formed with such a setting that could not be initially made for forming the image but may meet as much as possible the requirement desired by the user for forming the image.

The controller may convert the original data read by the data reading unit to image data by activating an application program installed in the image forming apparatus. Alternatively, the controller may transmit the original data read from the first non-contact tag to a computer and receive image data, which is converted by the computer from the original data. Here, the image data is converted from the original data by the upper device (computer). In the latter case, it is possible to form an image for a further increased number of types of original data of image data.

The image forming apparatus may further include a data recording unit disposed on a transporting path along which the second recording medium is transported through the image forming unit. The data recording unit may record, on a second non-contact tag attached to the second recording medium, the image data converted by the controller or computer. In this case, the image data for controlling the image forming unit obtained by activating the application program (software) or the image data obtained by communicating with the upper device (computer) is recorded on the second non-contact tag. Accordingly, to read data from the second non-contact tag to form an image, it is not necessary to activate an application or communicate with an upper device.

The image forming apparatus may further include a data recording unit disposed on a transporting path along which the second recording medium is transported through the image forming unit. The data recording unit may record, on a second non-contact tag attached to the second recording medium, a print setting in accordance with which the image forming unit forms the image on the second recording medium. In this case, when the controller has altered the setting for forming the image, the fourth data recording unit reads the setting data from the second non-contact tag storing the setting data, thereby facilitating the formation of the image with the altered setting.

Additionally, the data reading unit is disposed on a transporting path along which the first recording medium is transported through the image forming unit. The data reading unit may read data from the first non-contact tag attached to the first recording medium the data reading unit reads data from the first non-contact tag attached to the first recording medium without forming an image on the first recording medium. In this case, it is possible to only read data from the first non-contact tag attached to the recording medium.

A computer program product embodied on a computer readable medium, which when executed by a computer for controlling an image forming apparatus comprising: an image forming unit; and a data reading unit that reads, from a first non-contact tag attached to a first recording medium, original data of an image formed on the first recording medium by another image forming apparatus and a first print setting in accordance with which the other image forming apparatus forms the image on the first recording medium, causes the computer to perform operations includes: determining whether the image forming unit is capable of forming an image in accordance with the first print setting; and controlling the image forming unit to form an image. The controlling controls the image forming unit to form, on a second recording medium, an image based on the original data in accordance with the first print setting read by the data reading unit when it is determined that the image forming unit is capable of forming the image in accordance with the first print setting. The controlling controls the image forming unit to form, the second recording medium, an image based on the original data in accordance with a second print setting which is modified from the first print setting when the determining determines that the image forming unit is not capable of forming the image in accordance with the first print setting, the second print setting in accordance with which the image forming unit is capable of forming an image.

What is claimed is:

1. An image forming apparatus comprising:
   an image forming unit;
   a data reading unit that reads, from a first non-contact tag attached to a first recording medium, original data of an image formed on the first recording medium by another image forming apparatus and a first print setting in accordance with which the other image forming apparatus formed the image on the first recording medium,
   a processing unit;
   memory storing machine readable instructions, which when executed by the processing unit, cause the processing unit to function as:
   a determination unit that determines whether the image forming unit is capable of forming an image in accordance with the first print setting; and
   a controller that controls the image forming unit to form an image, wherein the controller controls the image forming unit to form, on a second recording medium,
   an image based on the original data in accordance with the first print setting read from the first non-contact tag when the determination unit determines that the image forming unit is capable of forming the image in accordance with the first print setting, and
   an image based on the original data in accordance with a second print setting which is modified from the first print setting when the determination unit determines that the image forming unit is not capable of forming the image in accordance with the first print setting, the image forming unit being capable of forming an image in accordance with the second print setting, wherein the second print setting is set as similar as possible to the first print setting as long as the image forming unit is capable of forming the image,
   wherein the data reading unit reads performance data indicating a performance of the other image forming apparatus, which formed the image on the first recording medium, from the first non-contact tag,
   wherein the determination unit determines whether the performance of the other image forming apparatus, which formed the image on the first recording medium, read by the data reading unit conforms to a performance of the image forming apparatus, and
   wherein the controller is operable to change the first print setting according to a user instruction when the determination unit determines that the image forming unit is capable of forming the image in accordance with the first print setting and the performance of the other image forming apparatus read from the first non-contact tag does not conform to the performance of the image forming apparatus.

2. The image forming apparatus according to claim 1, wherein the determination unit determines whether the image forming unit is capable of forming the image in accordance with the first print setting based on at least one of a performance of the image forming apparatus and a model number of the image forming apparatus.

3. The image forming apparatus according to claim 1, further comprising a data recording unit disposed on a transporting path along which the second recording medium is transported through the image forming unit, wherein the data recording unit records, on a second non-contact tag attached to the second recording medium, data read from the first non-contact tag by the data reading unit.

4. The image forming apparatus according to claim 1, wherein the controller controls the image forming unit to form the image without changing the first print setting when the determination unit determines that the image forming unit is capable of forming the image in accordance with the first print setting and the performance of the other image forming apparatus read by the data reading unit conforms to the performance of the image forming apparatus.

5. The image forming apparatus according to claim 1,
   wherein the data reading unit further reads, from the first non-contact tag, a third print setting to form an image in an ideal condition required by a user, and
   wherein when the image forming unit is capable of forming an image in accordance with a fourth print setting more similar to the third print setting than the first print setting, the controller controls the image forming unit to form an image based on the original data in accordance with the fourth print setting.

6. The image forming apparatus according to claim 1, wherein the controller converts the original data read by the data reading unit to image data by activating an application program installed in the image forming apparatus.

7. The image forming apparatus according to claim 1, wherein the controller transmits the original data read from the first non-contact tag to a computer and receives image data, which is converted by the computer from the original data, from the computer.

8. The image forming apparatus according to claim 6, further comprising a data recording unit disposed on a transporting path along which the second recording medium is transported through the image forming unit,
   wherein the data recording unit records, on a second non-contact tag attached to the second recording medium, the image data converted by the controller.

9. The image forming apparatus according to claim 7, further comprising a data recording unit disposed on a transporting path along which the second recording medium is transported through the image forming unit, wherein the data recording unit records, on a second non-contact tag attached to the second recording medium, the image data converted by the computer.

10. The image forming apparatus according to claim 1, further comprising a data recording unit disposed on a transporting path along which the second recording medium is transported through the image forming unit, wherein the data recording unit records, on a second non-contact tag attached to the second recording medium, a print setting in accordance with which the image forming unit forms the image on the second recording medium.

11. A non-transitory computer readable medium having computer executable instructions stored thereon, which when executed by a computer for controlling an image forming apparatus comprising: an image forming unit; and a data reading unit that reads, from a first non-contact tag attached to a first recording medium, original data of an image formed on the first recording medium by another image forming apparatus and a first print setting in accordance with which the other image forming apparatus formed the image on the first recording medium, causes the computer to perform operations comprising:

determining whether the image forming unit is capable of forming an image in accordance with the first print setting; and controlling the image forming unit to form an image, wherein the controlling includes controlling the image forming unit to form, on a second recording medium, an image based on the original data in accordance with the first print setting read by the data reading unit when the determining determines that the image forming unit is capable of forming the image in accordance with the first print setting, and controlling the image forming unit to form, on the second recording medium, an image based on the original data in accordance with a second print setting which is modified from the first print setting when the determining determines that the image forming unit is not capable of forming the image in accordance with the first print setting, the image forming unit being capable of forming an image in accordance with the second print setting, wherein the second print setting is set as similar as possible to the first print setting as long as the image forming unit is capable of forming the image, wherein the data reading unit reads performance data indicating a performance of the other image forming apparatus, which formed the image on the first recording medium, from the first non-contact tag, wherein the determining determines whether the performance of the other image forming apparatus, which formed the image on the first recording medium, read by the data reading unit conforms to a performance of the image forming apparatus, and wherein the computer readable medium has further instructions stored thereon that, when executed by the computer, causes the computer to perform operations including changing the first print setting according to the user instruction when the determining determines that the image forming unit is capable of forming the image in accordance with the first print setting and the performance of the other image forming apparatus read from the first non-contact tag does not conform to the performance of the image forming apparatus.

12. The non-transitory computer readable medium according to claim 11, wherein the determining determines whether the image forming unit is capable of forming the image in accordance with the first print setting based on at least one of a performance of the image forming apparatus and a model number of the image forming apparatus.

13. The non-transitory computer readable medium according to claim 11, wherein the image forming apparatus further comprises a data recording unit, and wherein the computer readable medium has further instructions stored thereon that, when executed by the computer, causes the computer to perform operations including controlling the data recording unit to record, on a second non-contact tag attached to the second recording medium, data read from the first non-contact tag.

14. The non-transitory computer readable medium according to claim 11, wherein the controlling controls the image forming unit to form the image without changing the first print setting when the determining determines that the image forming unit is capable of forming the image in accordance with the first print setting and the performance of the other image forming apparatus read from the first non-contact tag conforms to the performance of the image forming apparatus.

15. A non-transitory computer readable medium having computer executable instructions stored thereon, which when executed by a computer for controlling an image forming apparatus comprising: an image forming unit; and a data reading unit that reads, from a first non-contact tag attached to a first recording medium, original data of an image formed on the first recording medium by another image forming apparatus and a first print setting in accordance with which the other image forming apparatus formed the image on the first recording medium, causes the computer to perform operations comprising:

determining whether the image forming unit is capable of forming an image in accordance with the first print setting; and controlling the image forming unit to form an image, wherein the controlling includes controlling the image forming unit to form, on a second recording medium, an image based on the original data in accordance with the first print setting read by the data reading unit when the determining determines that the image forming unit is capable of forming the image in accordance with the first print setting, and controlling the image forming unit to form, on the second recording medium, an image based on the original data in accordance with a second print setting which is modified from the first print setting when the determining determines that the image forming unit is not capable of forming the image in accordance with the first print setting, the image forming unit being capable of forming an image in accordance with the second print setting, wherein the second print setting is set as similar as possible to the first print setting as long as the image forming unit is capable of forming the image, wherein the data reading unit further reads, from the first non-contact tag, a third setting to form an image in an ideal condition required by a user, and wherein when the image forming unit is capable of forming an image in accordance with a fourth print setting more similar to the third print setting than the first print setting, the controlling controls the image forming unit to form an image based on the original data in accordance with the fourth print setting.

16. The non-transitory computer readable medium according to claim 11, wherein the computer readable medium has further instructions stored thereon that, when executed by the computer, causes the computer to perform operations including converting the original data read by the data reading unit to image data by activating an application program installed in the image forming apparatus.

17. The non-transitory computer readable medium according to claim 11, wherein the computer readable medium has further instructions stored thereon that, when executed by the computer, causes the computer to perform operations including transmitting the original data read from the first non-contact tag to another computer and receiving image data from the other computer, which is converted by the other computer from the original data.

* * * * *